United States Patent
Park et al.

(10) Patent No.: US 10,084,563 B2
(45) Date of Patent: Sep. 25, 2018

(54) ASYMMETRIC HETEROGENEOUS WAVEFORM SHAPING IN WIRELESS COMMUNICATIONS

(71) Applicant: QUALCOMM INCORPORATED, San Diego, CA (US)

(72) Inventors: Seyong Park, San Diego, CA (US); Muhammad Abdelghaffar, Santa Clara, CA (US); Wei Zeng, San Diego, CA (US); Jing Jiang, San Diego, CA (US); Joseph Binamira Soriaga, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/661,256

(22) Filed: Jul. 27, 2017

(65) Prior Publication Data
US 2018/0145783 A1    May 24, 2018

Related U.S. Application Data

(60) Provisional application No. 62/423,907, filed on Nov. 18, 2016.

(51) Int. Cl.
*H04B 7/10* (2017.01)
*H04J 11/00* (2006.01)
(Continued)

(52) U.S. Cl.
CPC .... *H04J 11/0023* (2013.01); *H04L 25/03159* (2013.01); *H04L 25/03828* (2013.01);
(Continued)

(58) Field of Classification Search
CPC ... H04L 1/06; H04L 27/2647; H04L 27/2605; H04B 7/2621
(Continued)

(56) References Cited

U.S. PATENT DOCUMENTS

| | | | |
|---|---|---|---|
| 8,509,208 B2* | 8/2013 | Rimini | H04L 27/2657 370/343 |
| 8,705,676 B2* | 4/2014 | Ayrapetian | H04L 27/2676 375/260 |

(Continued)

FOREIGN PATENT DOCUMENTS

| | | |
|---|---|---|
| JP | 2008078790 A | 4/2008 |
| WO | 2017196667 A1 | 11/2017 |

OTHER PUBLICATIONS

International Search Report and Written Opinion—PCT/US2017/061981—ISA/EPO—dated Mar. 2, 2018.
(Continued)

*Primary Examiner* — Khai Tran
(74) *Attorney, Agent, or Firm* — Smith Tempel Blaha LLC

(57) ABSTRACT

Waveforms may be shaped in a wireless communications device by processing head tones of a multi-tone carrier using a head tone waveform shaping characteristic to provide a first sub-symbol, processing tail tones of the multi-tone carrier using a tail tone waveform shaping characteristic to provide a second sub-symbol, and processing center tones of the multi-tone carrier using a center tone waveform shaping characteristic to provide a third sub-symbol. The first, second, and third waveform shaping characteristics may be different from each other, i.e., the waveform shaping may be asymmetric. The first, second, and third sub-symbols may be combined to provide an output symbol.

30 Claims, 19 Drawing Sheets

(51) Int. Cl.
   *H04L 25/03* (2006.01)
   *H04L 27/26* (2006.01)
(52) U.S. Cl.
   CPC .... *H04L 25/03834* (2013.01); *H04L 27/2634* (2013.01); *H04L 2025/03414* (2013.01)
(58) Field of Classification Search
   USPC ........ 375/347, 222, 227, 260; 370/343, 344; 455/150.1
   See application file for complete search history.

(56) References Cited

U.S. PATENT DOCUMENTS

2017/0207941 A1\* 7/2017 Park .................... H04L 27/2605
2017/0331647 A1\* 11/2017 Abdelghaffar .... H04L 25/03006

OTHER PUBLICATIONS

Renfors M., et al., "Efficient Fast-Convolution Implementation of Filtered CP-OFDM Waveform Processing for 5G", 2015 IEEE Globecom Workshops (GC WKSHPS), IEEE, Dec. 6, 2015 (Dec. 6, 2015), 7 pages, XP032871024 [retrieved on Feb. 18, 2016].

\* cited by examiner

ASYMMETRIC HETEROGENEOUS WAVEFORM SHAPING IN WIRELESS COMMUNICATIONS

RELATED APPLICATIONS

This application claims the benefit of U.S. Provisional Patent Application No. 62/423,907, entitled "ASYMMETRIC HETEROGENEOUS WAVEFORM SHAPING IN WIRELESS COMMUNICATIONS," filed Nov. 18, 2016, the contents of which are hereby incorporated by reference in their entirety.

FIELD

The present disclosure relates to wireless communications, and more particularly, to waveform shaping systems and methods in wireless communications systems.

BACKGROUND

Wireless communications systems are widely deployed to provide various types of communications content such as voice, video, packet data, messaging, broadcast, and so on. These systems may be multiple-access systems capable of supporting communication with multiple users by sharing the available system resources (e.g., time, frequency, and power). By way of example, a wireless multiple-access communications system may include a number of base stations, each simultaneously supporting communication for multiple communication devices, each otherwise known as user equipment (UE). A base station may communicate with one or more UEs on downlink channels (e.g., for transmissions from a base station to a UE) and uplink channels (e.g., for transmissions from a UE to a base station). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Some multiple-access wireless communications systems, such as OFDM-based systems, may employ multi-carrier waveforms. In such multi-carrier systems, a carrier comprises multiple sub-carriers, also referred to as tones. Optimization techniques that may be employed in multi-carrier systems, such as OFDM-based systems, include time-domain windowing and time-domain filtering. One example of a time-domain windowing technique is known as "weighted overlap and add" or WOLA.

SUMMARY

Various implementations of systems, methods, and apparatuses within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that relative dimensions of elements depicted in the drawing figures may not be to scale.

One aspect of the disclosure provides a method for waveform shaping in a wireless communications device. The method may include processing a first plurality of tones of a multi-tone carrier using a first waveform shaping characteristic to provide a first sub-symbol, and processing a second plurality of tones of the multi-tone carrier using a second waveform shaping characteristic to provide a second sub-symbol. The first and second waveform shaping characteristics are different from each other, i.e., the waveform shaping may be asymmetric. The method may further include combining the first and second sub-symbols to provide an output symbol. The method may also include transforming tones between frequency domain and time domain in a transmitter, receiver, or transceiver.

Another aspect of the disclosure provides a system for waveform shaping in a wireless communications device. The system may include a waveform shaper configured to process a first plurality of tones of a multi-tone carrier using a first waveform shaping characteristic to provide a first sub-symbol and configured to process a second plurality of tones of the multi-tone carrier using a second waveform shaping characteristic to provide a second sub-symbol. The first and second waveform shaping characteristics are different from each other, i.e., the waveform shaping may be asymmetric. The system may further include a combiner configured to combine the first and second sub-symbols to provide an output symbol. The system may also include first and second transform paths configured to transform tones between frequency domain and time domain in a transmitter, receiver, or transceiver.

Still another aspect of the disclosure provides a computer program product comprising a non-transitory computer-readable medium storing computer-executable code for waveform shaping in wireless communications. The code is executable by a processor to control a method. The method may include processing a first plurality of tones of a multi-tone carrier using a first waveform shaping characteristic to provide a first sub-symbol, and processing a second plurality of tones of the multi-tone carrier using a second waveform shaping characteristic to provide a second sub-symbol. The first and second waveform shaping characteristics are different from each other, i.e., the waveform shaping may be asymmetric. The method may further include combining the first and second sub-symbols to provide an output symbol. The method may also include transforming tones between frequency domain and time domain in a transmitter, receiver, or transceiver.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described herein may be performed in an order different from that described, and various steps may be added, omitted, or combined. Also, features described with respect to some examples may be combined in other examples.

Examples described below are directed to waveform shaping in a wireless communications device, such as a transmitter, receiver, or transceiver. A wireless communications transmitter may, for example, have orthogonal frequency-division multiplexing (OFDM) waveform synthesis, in which a carrier comprising multiple sub-carriers, also referred to as tones, is generated. The sub-carriers or tones may include center tones, head tones (i.e., frequencies lower than the center tones), and tail tones (i.e., frequencies higher than the center tones). The waveform shaping may be performed in the time domain. Thus, in a transmitter, the waveform synthesis may include transforming the head, center, and tail tones from the frequency domain to the time domain (e.g., using an inverse FFT or "IFFT"). Similarly, in a receiver, the inverse of waveform synthesis, waveform analysis, may include transforming the head, center, and tail tones from the time domain to the frequency domain (e.g., using an IFFT). Waveforms may be shaped by processing a first plurality of tones, such as the head tones, using a first waveform shaping characteristic to provide a first sub-symbol, and processing a second plurality of tones, such as the tail tones, using a second waveform shaping characteristic to provide a second sub-symbol. The first and second waveform shaping characteristics may be different from each other, i.e., the waveform shaping may be asymmetric. In some examples, the first and second waveform shaping characteristics may comprise weighting functions used in a weighted overlap and add (WOLA) operation. In other examples, the first and second waveform shaping characteristics may comprise bandpass filters. The first and second sub-symbols may be combined to provide an output symbol, and successive output symbols may be combined (e.g., overlapped and added in accordance with WOLA).

Figure 1:
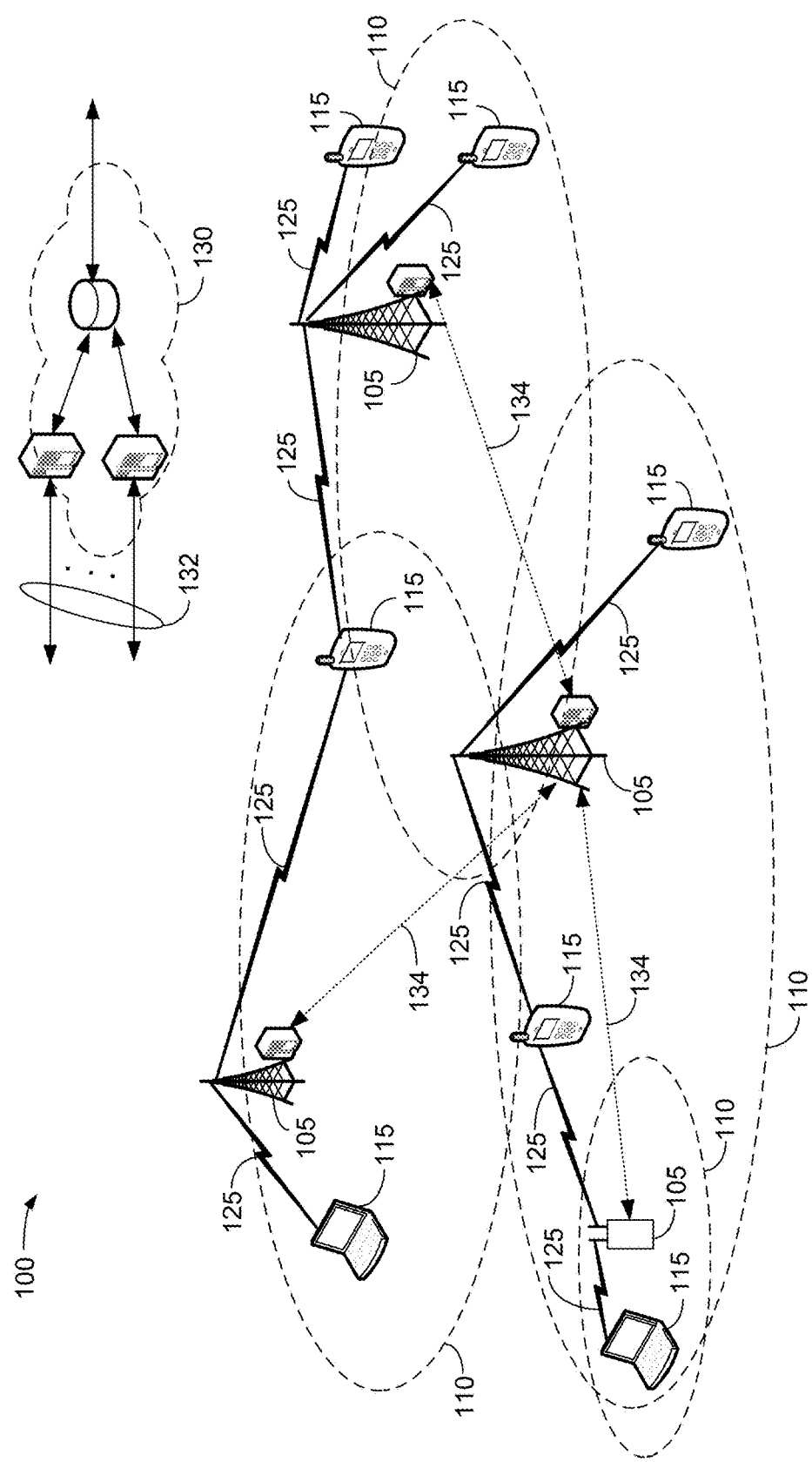
FIG. 1 is a block diagram of an example of a wireless communications system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through a first set of backhaul links 132 (e.g., S1, etc.) and may perform radio configuration and scheduling for communication with the UEs 115, or may operate under the control of a base station controller (not shown). In various examples, base stations 105 may communicate, either directly or indirectly (e.g., through core network 130), with each other over a second set of backhaul links 134 (e.g., X1, etc.), which may be wired or wireless communication links.

Each base station site may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). Wireless communications system 100 may include base stations 105 of different types (e.g., macro and/or small cell base stations). There may be overlapping geographic coverage areas 110 for different technologies.

In some examples, wireless communications system 100 may be one or more of an LTE/LTE-A network and a 5G network. In LTE/LTE-A networks, the term evolved Node B (eNB) or in a 5G network, the term millimeter wave B (mWB) may be generally used to describe base stations 105, while the term UE may be generally used to describe UEs 115. Wireless communications system 100 may be a heterogeneous LTE/LTE-A and 5G network in which different types of eNBs and/or mWBs provide coverage for various geographical regions. For example, each eNB, mWB, or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context. In some examples, wireless communications system 100 may be, or may include a millimeter wave communication network.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

Wireless communications system 100 may support synchronous or asynchronous operation. For synchronous operation, base stations 105 may have similar frame timing, and transmissions from different base stations may be approximately aligned in time. For asynchronous operation, base stations 105 may have different frame timing, and transmissions from different base stations may not be aligned in time.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, mWBs, relay base stations, and the like. A UE 115 may also be able to communicate with other UEs either within or outside the same coverage area of a base station via D2D communications.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some examples, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Figure 2:
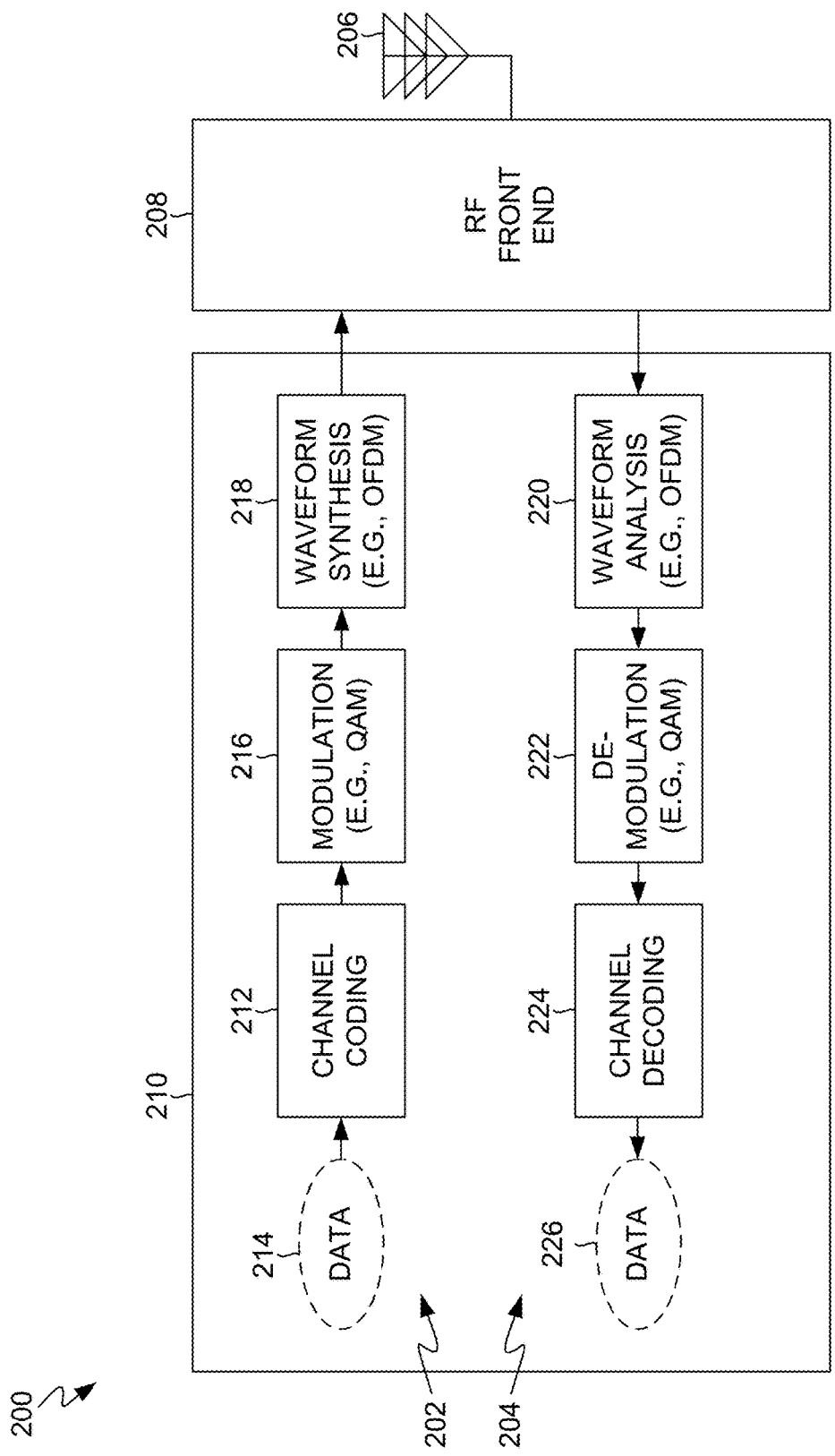
FIG. 2 is a block diagram of an example of a transceiver device or user equipment, in accordance with various aspects of the present disclosure.

FIG. 2 is a block diagram of a UE 200, in accordance with various aspects of the present disclosure. The UE 200 may be an example of one or more aspects of UE 115 described above with reference to FIG. 1. As UE 200 serves as a transceiver, it has a transmitter portion 202 and a receiver portion 204. Although some examples described in this disclosure may relate to transmitting while other examples may relate to receiving, waveform shaping principles described in relation to transmitting also apply to receiving, and waveform shaping principles described in relation to receiving also apply to transmitting.

The UE 200 may include one or more antennas 206, RF front end circuitry 208, and baseband system circuitry 210. Transmitter portion 202 includes channel coding logic 212 that encodes data 214, modulation logic 216 that modulates the encoded data provided by channel coding logic 212, and waveform synthesis logic 218 that synthesizes or generates baseband transmit (TX) signals. The RF front end circuitry 208 upconverts the baseband TX signals provided by waveform synthesis logic 218 to radio frequency (RF) for transmission via antennas 206. Portions of baseband system circuitry 210 that provide data 214 to be transmitted are not shown for purposes of clarity but are well understood by one of ordinary skill in the art. The RF front end circuitry 208 also downconverts RF signals received from antennas 206 to baseband and provides the resulting baseband receive (RX) signals to receiver portion 204. Receiver portion 204 includes waveform analysis logic 220 that analyzes or receives the baseband RX signals, demodulation logic 222 that demodulates the received signals provided by waveform analysis logic 220, and channel decoding logic 224 that decodes the demodulated signals provided by demodulation logic 222. Portions of baseband system circuitry 210 that further process the decoded data 226 provided by channel decoding logic 224 are not shown for purposes of clarity but are well understood by one of ordinary skill in the art.

Various modulation and waveform synthesis schemes may be used. For example, modulation logic 216 and demodulation logic 222 may be configured in accordance with quadrature amplitude modulation (QAM). As well understood by one of ordinary skill in the art, QAM independently modulates each sub-carrier or tone with (encoded) baseband data. Waveform synthesis logic 218 and waveform analysis logic 220 may be configured in accordance with, for example, OFDM. As well understood by one of ordinary skill in the art, OFDM generates multiple orthogonally spaced sub-carrier signals or tones corresponding to multiple information channels.

Figure 3:
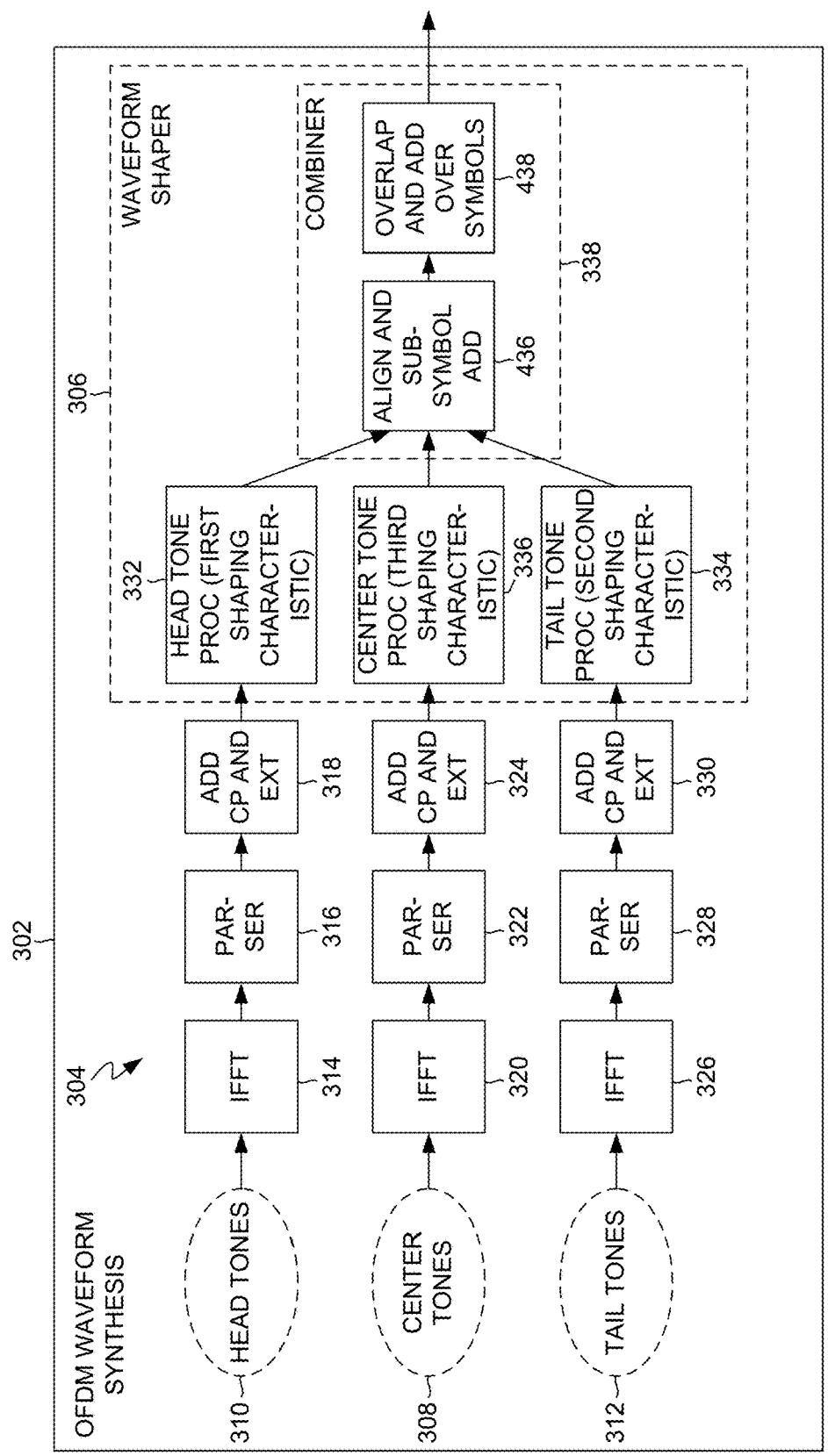
FIG. 3 is a block diagram of an example of a waveform synthesis portion of a transceiver device or user equipment, in accordance with various aspects of the present disclosure.

FIG. 3 is a block diagram of OFDM waveform synthesis logic 302, in accordance with various aspects of the present disclosure. The OFDM waveform synthesis logic 302 may be an example of one or more aspects of waveform synthesis logic 218 described above with reference to FIG. 2. The OFDM waveform synthesis logic 302 may include a transform section 304 and a waveform shaper 306. Transform section 304 may operate upon center tones 308, head tones 310, and tail tones 312. Center tones 308 comprise a group or range of multiple sub-carriers or tones that lie between head tones 310 (i.e., another group or range of multiple sub-carriers or tones lower than center tones 308 in frequency), and tail tones 312 (i.e., still another group or range of multiple sub-carriers or tones higher than center tones 308 in frequency).

Transform section 304 includes IFFT logic 314 that converts or transforms head tones 310 from the frequency domain to the time domain. Transform section 304 not only performs such a transform but also may perform ancillary functions. For example, transform section 304 may also include a parallel-to-serial converter 316 that converts the output signals provided by IFFT logic from a parallel format to a serial format. Transform section 304 may also include, for example, extension logic 318 that adds a cyclic prefix (CP) and an extension (EXT) to the serial output signals provided by parallel-to-serial converter 316. As well understood by one of ordinary skill in the art, a cyclic prefix is a part of the symbol (or sub-symbol in the case of separate processing paths for center tones 308, head tones 310, and tail tones 312) that is copied from one end of the symbol and appended to the other end. This process of adding a cyclic prefix helps to reduce inter-symbol interference (ISI). An additional extension may also be added for the overlap-and-add operation across successive symbols over time. Transform section 304 may similarly include another path comprising IFFT logic 320, a parallel-to-serial converter 322, and extension logic 324, which together process center tones 308. Transform section 304 may similarly include still another path comprising IFFT logic 326, a parallel-to-serial converter 328, and extension logic 330, which together process tail tones 312.

Waveform shaper 306 may include a head tone processor 332 configured to process head tones 310 (as transformed by transform section 304) using a first waveform shaping characteristic, a tail tone processor 334 configured to process tail tones 312 (as transformed by transform section 304) using a second waveform shaping characteristic, and a center tone processor 336 configured to process center tones 308 (as transformed by transform section 304) using a third waveform shaping characteristic. Significantly, in this example, the first, second, and third waveform shaping characteristics may be different from each other or "asymmetric." The output of each of head tone processor 332, tail tone processor 334, and center tone processor 336 comprises a sequence or stream of sub-symbols. A combiner 338 is configured to combine a first sub-symbol provided by head tone processor 332, a second sub-symbol provided by center tone processor 334, and a third sub-symbol provided by tail tone processor 336 into an output symbol. As described below with regard to FIG. 4, in some examples combiner 338 may comprise an aligner and sub-symbol adder 436 and an overlapper and symbol adder 438. The output of combiner 338 may comprise a sequence or stream of symbols.

Figure 4:
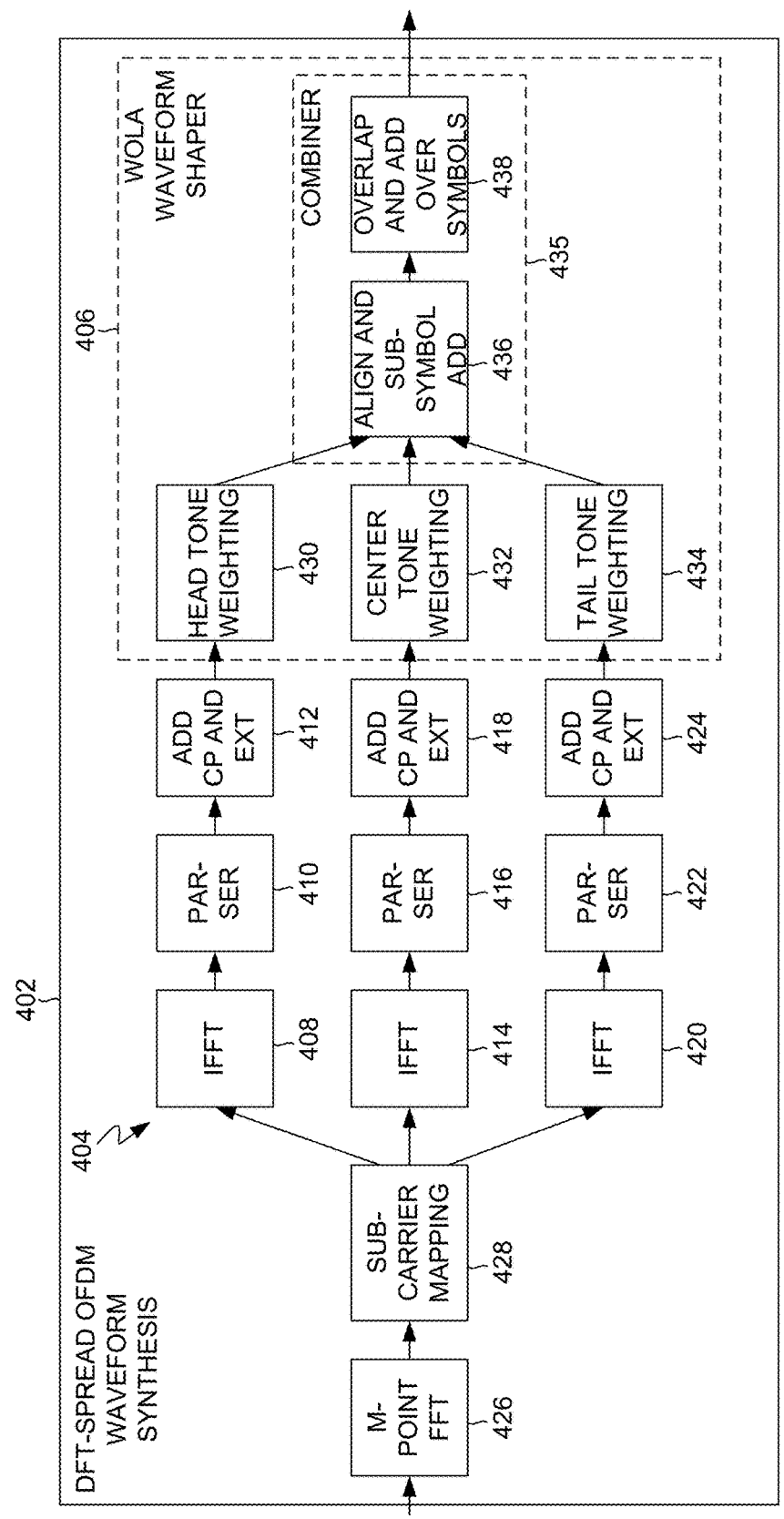
FIG. 4 is a block diagram of another example of a waveform synthesis portion of a transceiver device or user equipment, in accordance with various aspects of the present disclosure.

FIG. 4 is a block diagram of Discrete Fourier Transform-spread OFDM (DFT-s-OFDM) waveform synthesis logic 402, in accordance with various aspects of the present disclosure. The DFT-s-OFDM waveform synthesis logic 402 may be an example of one or more aspects of above-described OFDM waveform synthesis logic 302 (FIG. 3) or 218 (FIG. 2). The DFT-s-OFDM waveform synthesis logic 402 may include a transform section 404 and a WOLA waveform shaper 406. As transform section 404 may be similar to above-described transform section 304 (FIG. 3), transform section 404 may include IFFT logic 408, a parallel-to-serial converter 410, and extension logic 412, which together process head tones, IFFT logic 414, a parallel-to-serial converter 416, and extension logic 418, which together process center tones, and IFFT logic 420, a parallel-to-serial converter 422, and extension logic 424, which together process tail tones.

FIG. 4 also illustrates that in accordance with DFT-spread OFDM principles, the source of the head tones, center tones, and tail tones may comprise, for example, FFT logic 426 and a sub-carrier mapper 428. A serial-to-parallel conversion operation may also occur between the input of FFT logic 426 and the output of a modulator, such as modulation logic 216 (FIG. 2), but is not shown for purposes of clarity. The FFT logic 426 may perform an M-point FFT on a time-domain symbol block, where M is the total number of discrete tones (i.e., head tones, center tones, and tail tones). Sub-carrier mapper 428 then allocates or maps the tones provides by FFT logic 428 to the total set of sub-carriers.

The WOLA waveform shaper 406 processes head tones by applying head tone weighting function 430, processes center tones by applying center tone weighting function 432, and processes tail tones by applying tail tone weighting function 434. As described in further detail below, head tone weighting function 430, center tone weighting function 432, and tail tone weighting function 434 may be different from each other. A combiner 435 may combine the weighted sub-symbols provided by head tone weighting function 430, center tone weighting function 432, and tail tone weighting function 434. Combiner 435 may include an aligner and sub-symbol adder 436 configured to align (in the time domain) a weighted head tone sub-symbol provided by head tone weighting function 430, a weighted center tone sub-symbol provided by center tone weighting function 432, and a weighted tail tone sub-symbol provided by tail tone weighting function 434 and add or sum them to form a symbol. Combiner 435 may further includes an overlapper and symbol adder 438 configured to overlap and add two successive symbols as described below with regard to FIG. 6.

Figure 5A:
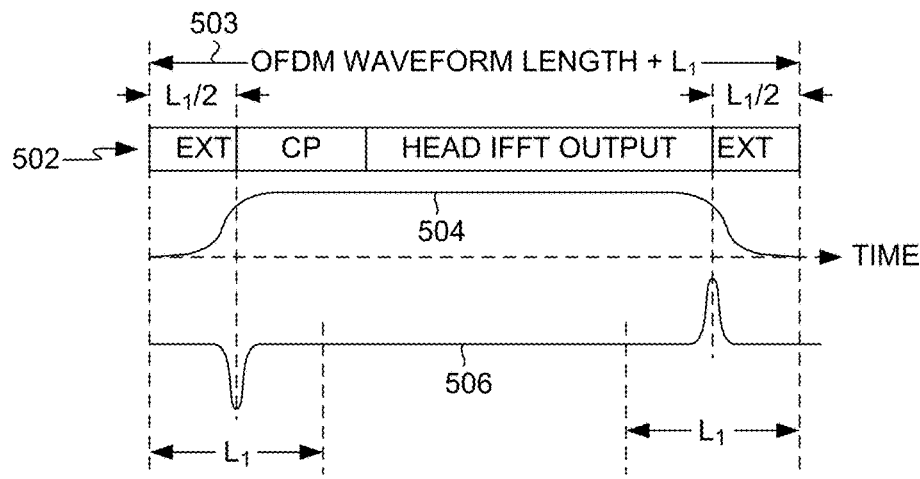
FIG. 5A is a waveform diagram of an example of a head tone complex weighting function, in accordance with various aspects of the present disclosure.

FIG. 5A illustrates an example of a head tone sub-symbol 502 and a complex-valued head tone sub-symbol weighting function comprising a real part 504 and an imaginary part 506. The extension (EXT) of head tone sub-symbol 502 may have a duration or length of $L_1$. The head tone sub-symbol weighting function may be applied during a time interval 503 (OFDM waveform length+extension length $L_1$) by, for example, head tone weighting function 430 (FIG. 4). Note that the extension of length $L_1$ extends a duration or time interval $L_1/2$ from the sub-symbol head and $L_1/2$ from the sub-symbol tail. That is, in FIGS. 5A-5C, the notation "EXT" represents a time interval of one-half the extension. The notation "CP" denotes the cyclic prefix.

Figure 5B:
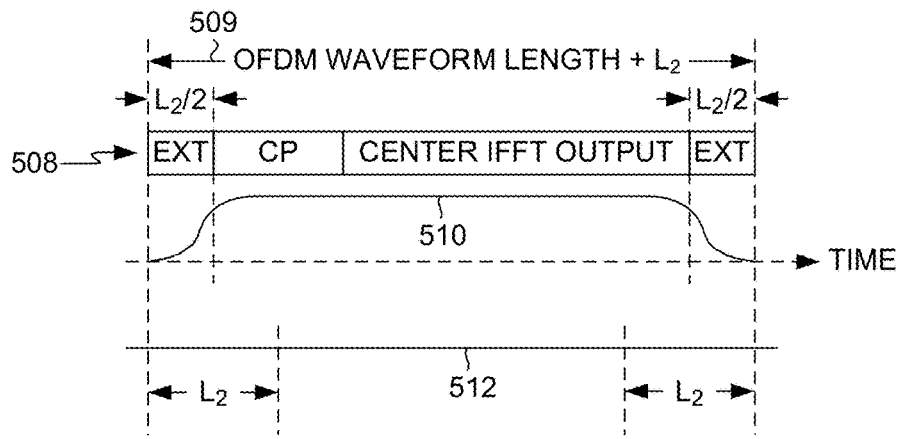
FIG. 5B is a waveform diagram of an example of a center tone complex weighting function, in accordance with various aspects of the present disclosure.

FIG. 5B further illustrates an example of a center tone sub-symbol 508 and a complex-valued center tone sub-symbol weighting function comprising a real part 510 and an imaginary part 512. The extension (EXT) of center tone sub-symbol 508 may have a duration or length of $L_2$. The center tone sub-symbol weighting function may be applied during a time interval 509 (OFDM waveform length+extension length $L_2$) by, for example, center tone weighting function 432 (FIG. 4). Note that the extension of length $L_2$ extends a duration or time interval $L_2/2$ from the sub-symbol head and $L_2/2$ from the sub-symbol tail.

Figure 5C:
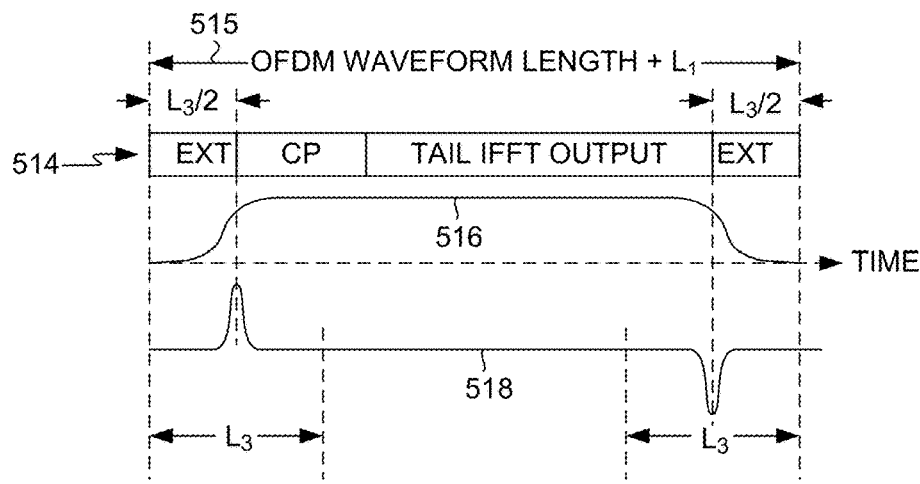
FIG. 5C is a waveform diagram of an example of a tail tone complex weighting function, in accordance with various aspects of the present disclosure.

FIG. 5C still further illustrates an example of a tail tone sub-symbol 514 and a complex-valued tail tone sub-symbol weighting function comprising a real part 516 and an imaginary part 518. The extension (EXT) of tail tone sub-symbol 514 may have a duration or length of $L_3$. The tail tone sub-symbol weighting function may be applied during a time interval 515 (OFDM waveform length+extension length $L_3$) by, for example, tail tone weighting function 434 (FIG. 4). Note that the extension of length $L_3$ extends a duration or time interval $L_3/2$ from the sub-symbol head and $L_3/2$ from the sub-symbol tail.

Figure 6:
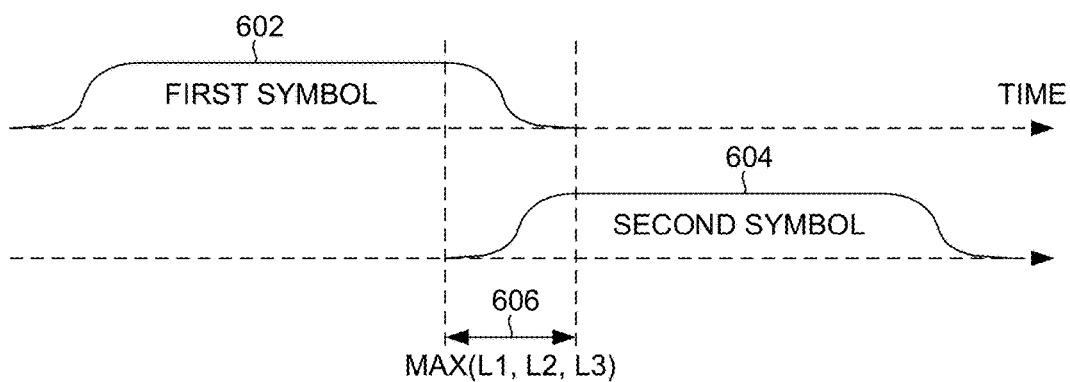
FIG. 6 is a waveform diagram illustrating an example of weighted symbol overlap and addition, in accordance with various aspects of the present disclosure.

FIG. 6 illustrates an example of the overlap and add portion of a WOLA operation. Overlapper and symbol adder 438 (FIG. 4) may perform this function. The tail portion of a first symbol 602 is overlapped with the head portion of a second symbol 604 that immediately follows first symbol 602 in time. The duration or length of the overlap interval 606 may be the largest or maximal value among $L_1$, $L_2$, and $L_3$.

Figure 7A:
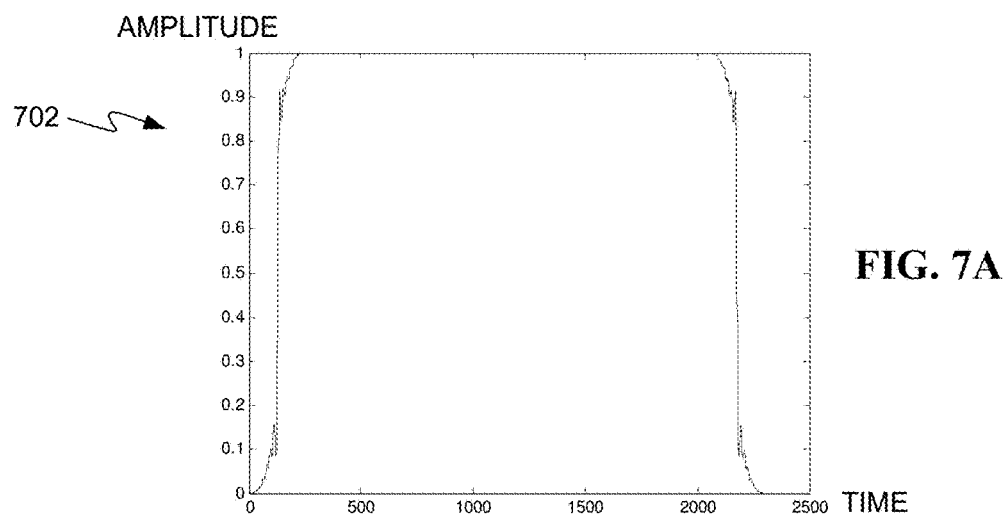
FIG. 7A is a waveform graph showing an example of the real part of a head tone complex weighting function, in accordance with various aspects of the present disclosure.

FIG. 7A is a waveform graph 702 showing an example of the real part of a complex-valued head tone sub-symbol weighting function. Waveform graph 702 may be an example of real part 504 (FIG. 5A), which is a more generalized and not-to-scale depiction.

Figure 7B:
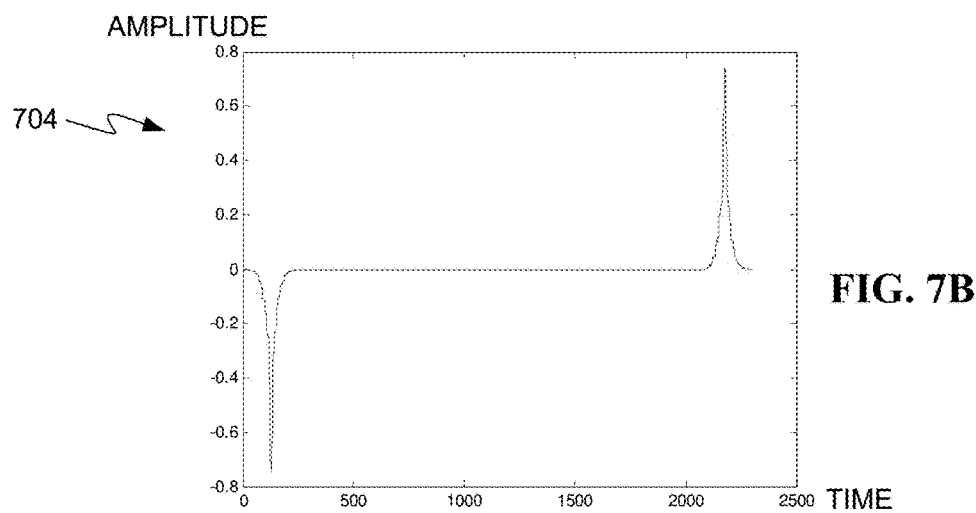
FIG. 7B is a waveform graph showing an example of the imaginary part of a head tone complex weighting function, in accordance with various aspects of the present disclosure.

FIG. 7B is a waveform graph 704 showing an example of the imaginary part of a complex-valued head tone sub-symbol weighting function. Waveform graph 704 may be an example of imaginary part 506 (FIG. 5A), which is a more generalized and not-to-scale depiction.

Figure 7C:
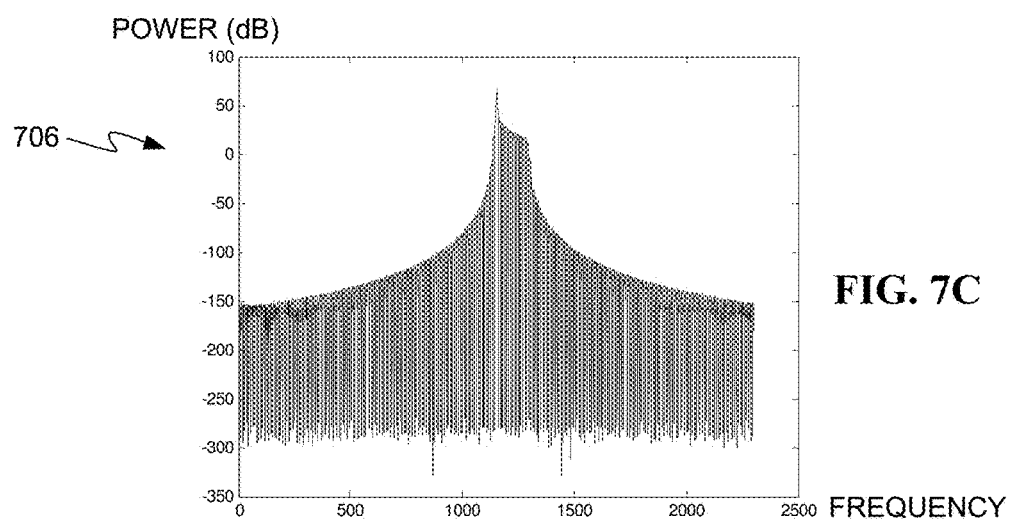
FIG. 7C is a power spectral density (PSD) graph showing an example of the result of applying the complex weighting function of FIGS. 7A-7B, in accordance with various aspects of the present disclosure.

FIG. 7C is a power spectral density (PSD) graph 706 showing an example of the PSD of a weighted head tone sub-symbol resulting from applying the complex-valued head tone sub-symbol weighting function of FIGS. 7A-7B. For example, PSD graph 706 may be an example of the PSD of the output of head tone weighting function 430 (FIG. 4).

Figure 8A:
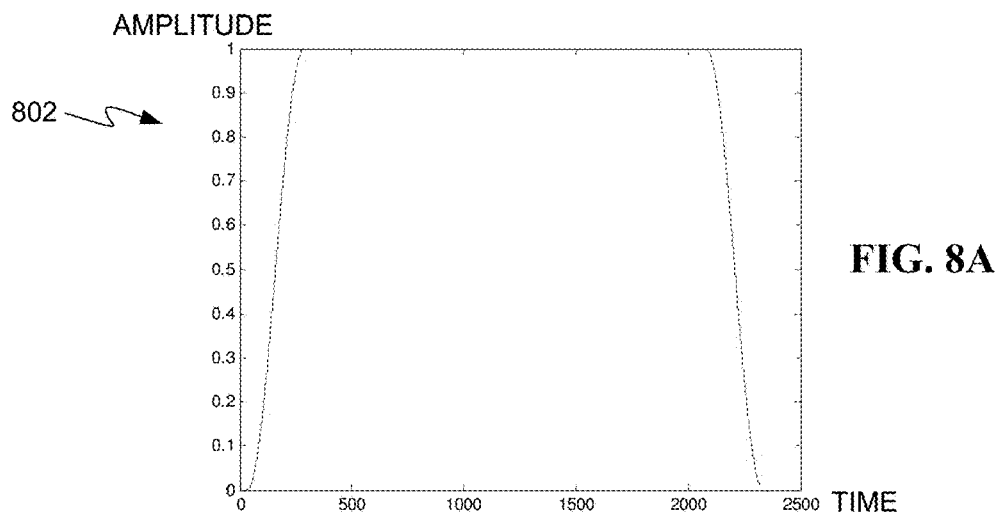
FIG. 8A is a waveform graph showing an example of the real part of a center tone complex weighting function, in accordance with various aspects of the present disclosure.

FIG. 8A is a waveform graph 802 showing an example of the real part of a complex-valued center tone sub-symbol weighting function. Waveform graph 802 may be an example of real part 510 (FIG. 5B), which is a more generalized and not-to-scale depiction.

Figure 8B:
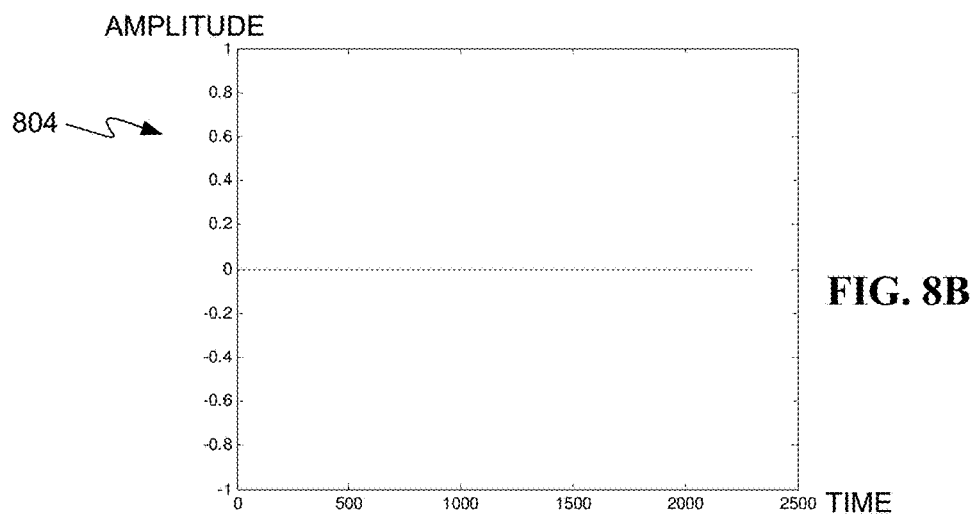
FIG. 8B is a waveform graph showing an example of the imaginary part of a center tone complex weighting function, in accordance with various aspects of the present disclosure.

FIG. 8B is a waveform graph 804 showing an example of the imaginary part of a complex-valued center tone sub-symbol weighting function. Waveform graph 804 may be an example of imaginary part 512 (FIG. 5B), which is a more generalized and not-to-scale depiction.

Figure 8C:
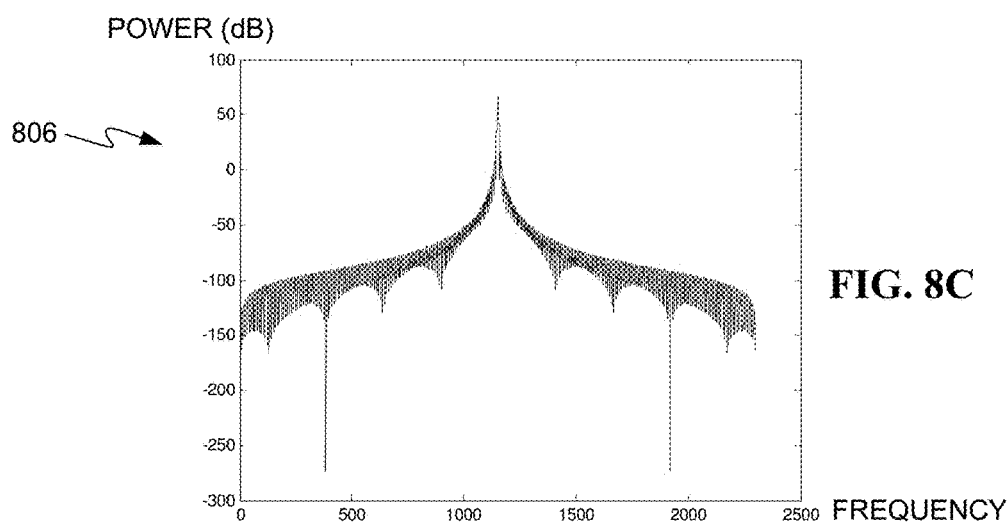
FIG. 8C is a PSD graph showing an example of the result of applying the complex weighting function of FIGS. 8A-8B, in accordance with various aspects of the present disclosure.

FIG. 8C is a power spectral density (PSD) graph 806 showing an example of the PSD of a weighted center tone sub-symbol resulting from applying the complex-valued center tone sub-symbol weighting function of FIGS. 8A-8B. For example, PSD graph 806 may be an example of the PSD of the output of center tone weighting function 432.

Figure 9A:
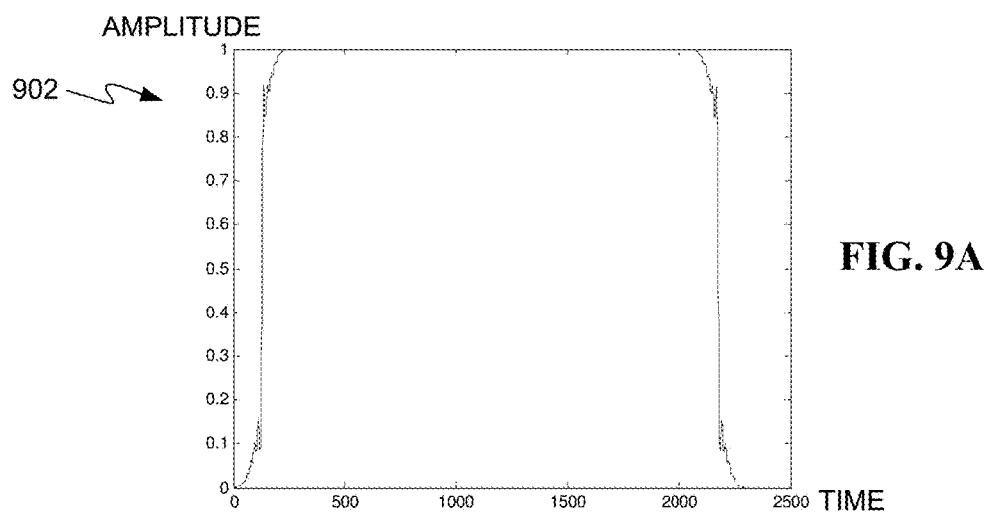
FIG. 9A is a waveform graph showing an example of the real part of a tail tone complex weighting function, in accordance with various aspects of the present disclosure.

FIG. 9A is a waveform graph 902 showing an example of the real part of a complex-valued tail tone sub-symbol weighting function. Waveform graph 902 may be an example of real part 516 (FIG. 5C), which is a more generalized and not-to-scale depiction.

Figure 9B:
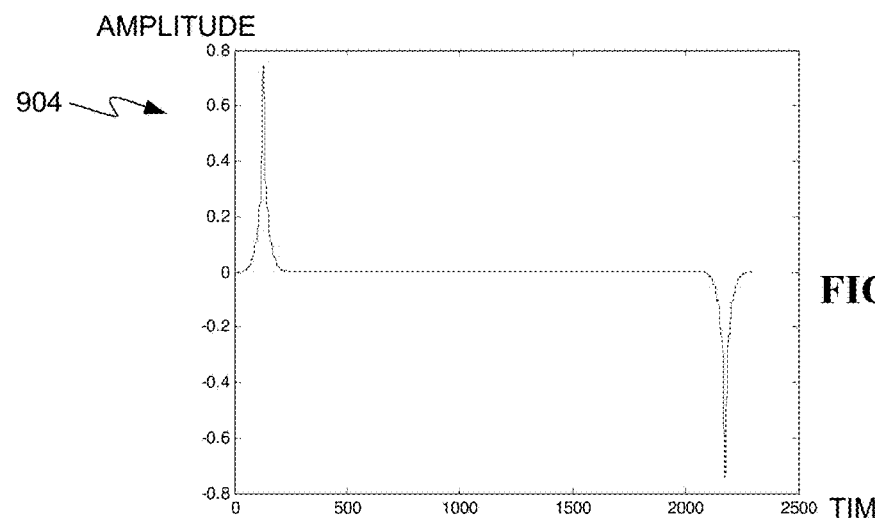
FIG. 9B is a waveform graph showing an example of the imaginary part of a tail tone complex weighting function, in accordance with various aspects of the present disclosure.

FIG. 9B is a waveform graph 904 showing an example of the imaginary part of a complex-valued tail tone sub-symbol weighting function. Waveform graph 904 may be an example of imaginary part 518 (FIG. 5C), which is a more generalized and not-to-scale depiction.

Figure 9C:
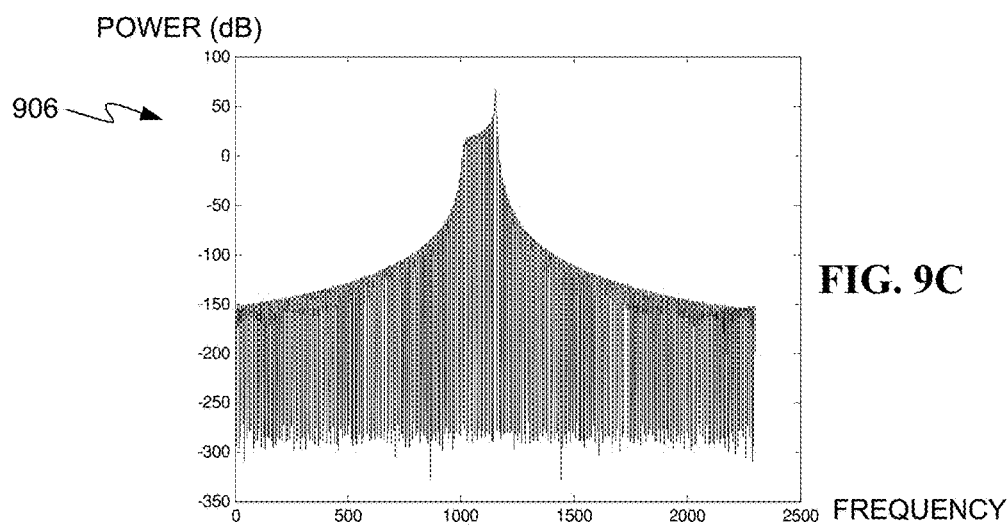
FIG. 9C is a PSD graph showing an example of the result of applying the complex weighting function of FIGS. 9A-9B, in accordance with various aspects of the present disclosure.

FIG. 9C is a power spectral density (PSD) graph 906 showing an example of the PSD of a weighted tail tone sub-symbol resulting from applying the complex-valued tail tone sub-symbol weighting function of FIGS. 9A-9B. For example, PSD graph 906 may be an example of the PSD of the output of tail tone weighting function 434.

Figure 10:
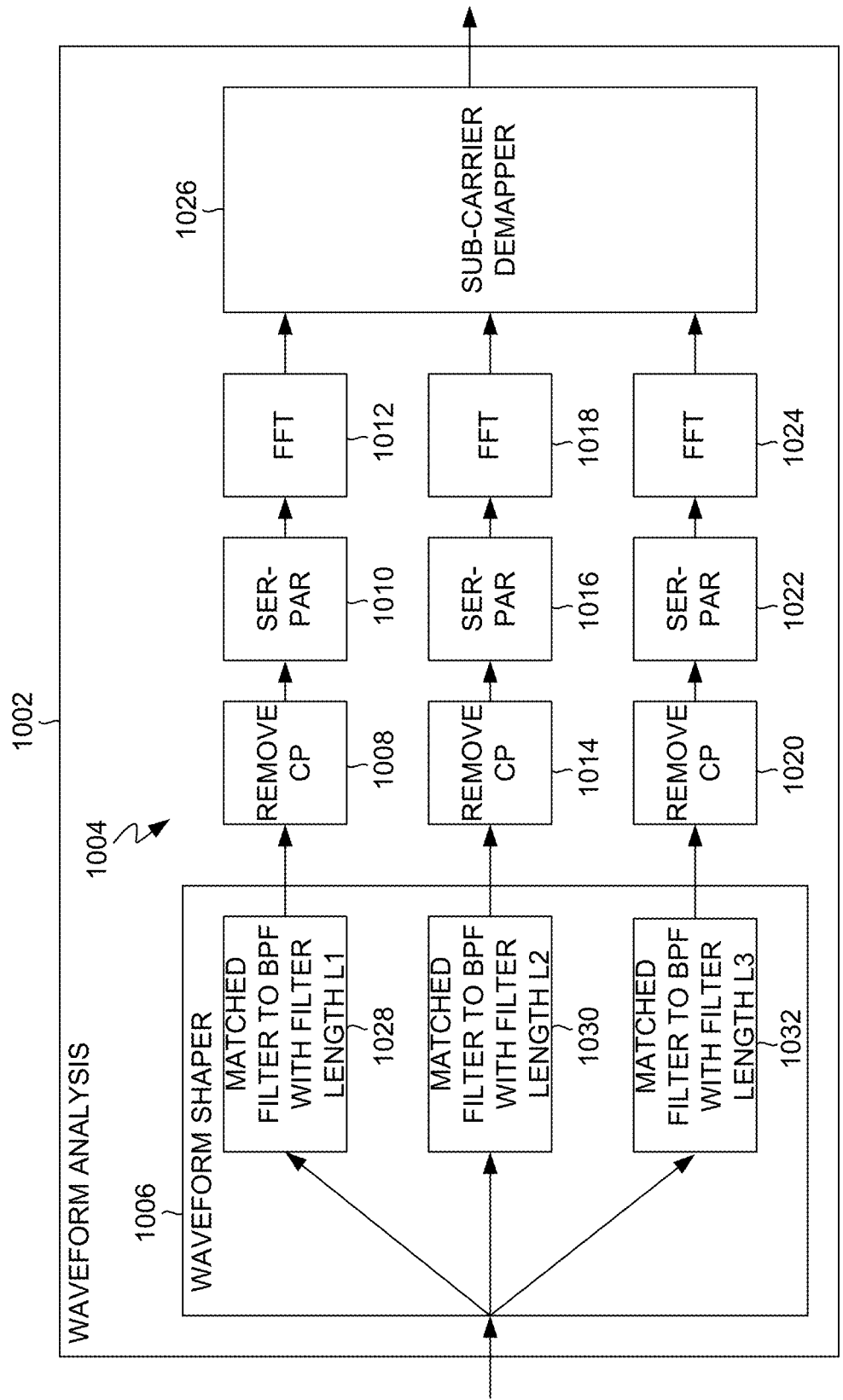
FIG. 10 is a block diagram of an example of a waveform analysis portion of a transceiver device or user equipment, in accordance with various aspects of the present disclosure.

FIG. 10 is a block diagram of waveform analysis logic 1002, in accordance with various aspects of the present disclosure. Waveform analysis logic 1002 may be an example of one or more aspects of waveform analysis logic 220 of receiver portion 204 described above with reference to FIG. 2. Waveform analysis logic 1002 may include a transform section 1004 and a WOLA waveform shaper 1006. As part of receiver portion 204, waveform analysis logic 1002 serves an inverse of the function of OFDM waveform synthesis logic 302 (FIG. 3) and 402 (FIG. 4). Nevertheless, as understood by one of ordinary skill in the art, the same principles of operation described above with regard to waveform synthesis logic 302 and 402 are generally applicable to waveform analysis logic 1002. For example, WOLA waveform shaper 1006 may have a structure and function similar to above-described WOLA waveform shapers 306 (FIGS. 3) and 406 (FIG. 4). For example, WOLA waveform shaper 1006 may include a first matched filter to bandpass filtering with length $L_1$, a second matched filter to bandpass filtering with length $L_2$, and a third matched filter to bandpass filtering with length $L_3$. Matched filters are designed based on three TX shaping filter 1130, 1132 1134 respectively. If the impulse response of the filter 1130 with length $L_1$ is $h_1(t)$, the impulse response of the filter 1028 is the complex conjugate of $h_1(L_1-t)$. If the impulse response of the filter 1132 with length $L_2$ is $h_2(t)$, the impulse response of the filter 1030 is the complex conjugate of $h_2(L2-t)$.

The WOLA waveform shaper 1006 receives baseband receive (RX) signals from, for example, RF front end circuitry 208 (FIG. 2). The WOLA waveform shaper 1006 provides head tones, center tones, and tail tones to three corresponding paths of transform section 1004. Although not shown for purposes of clarity, WOLA waveform shaper 1006 may include a splitter that serves an inverse of the function of combiner 338 (FIG. 3). The portion or path of transform section 1004 that processes head tones includes a CP remover 1008, a serial-to-parallel converter 1010, and FFT logic 1012. Similarly, the portion or path of transform section 1004 that processes center tones includes a CP remover 1014, a serial-to-parallel converter 1016, and FFT logic 1018. Likewise, the portion or path of transform section 1004 that processes tail tones includes a CP remover 1020, a serial-to-parallel converter 1022, and FFT logic 1024. A sub-carrier demapper 1026 may combine the outputs of the three paths. Sub-carrier demapper 1026 may extract the head tones from the output of FFT logic 1012, extract the center tones from the output of FFT logic 1018, and extract the tail tones from the output of FFT logic 1024. The resulting output of waveform analysis logic 1002 may be provided to demodulation logic 222 (FIG. 2), for example.

Figure 11:
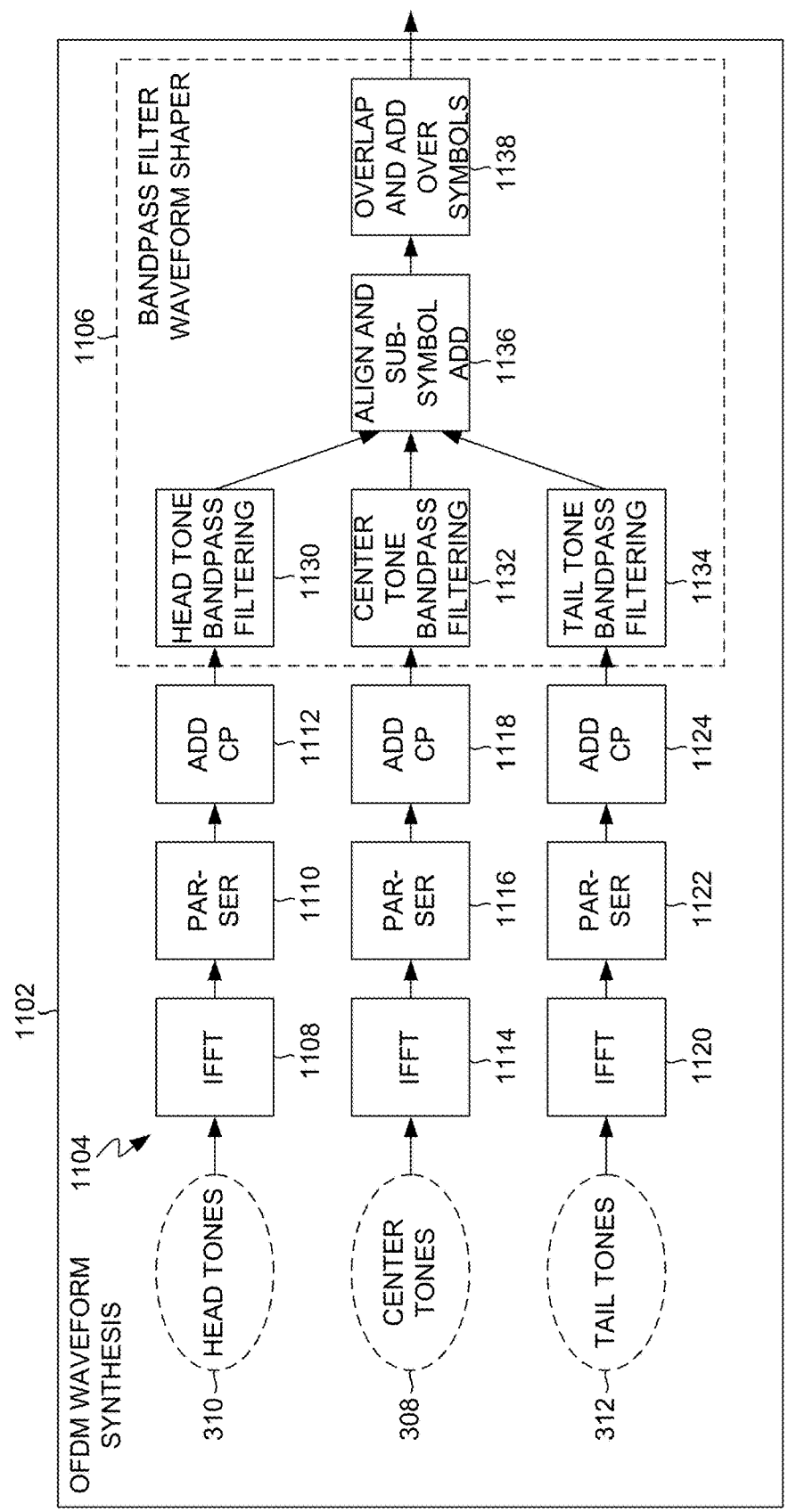
FIG. 11 is a block diagram of a still another example of a waveform synthesis portion of a transceiver device or user equipment, in accordance with various aspects of the present disclosure.

FIG. 11 is a block diagram of OFDM waveform synthesis logic 1102, in accordance with various aspects of the present disclosure. The OFDM waveform synthesis logic 1102 may be an example of one or more aspects of above-described waveform synthesis logic 218 (FIG. 2). The OFDM waveform synthesis logic 1102 is similar to OFDM waveform synthesis logic 302 described above with regard to FIG. 3 except that in shaping the waveforms OFDM waveform synthesis logic 1102 applies bandpass filter windowing (i.e., time-domain filtering) instead of WOLA windowing. The OFDM waveform synthesis logic 1102 includes a transform section 1104 and a bandpass filter waveform shaper 1106. Transform section 1104 includes IFFT logic 1108, a parallel-to-serial converter 1110, and extension logic 1112, which together process head tones 310, IFFT logic 1114, a parallel-to-serial converter 1116, and extension logic 1118, which together process center tones 308, and IFFT logic 1120, a parallel-to-serial converter 1122, and extension logic 1124, which together process tail tones 312. As the foregoing elements of OFDM waveform synthesis logic 1102 are configured to operate in the same manner as described above with regard to corresponding elements shown in FIG. 4, the configuration and operation of the foregoing elements are not described in similar detail.

Bandpass filter waveform shaper 1106 includes a head tone bandpass filter 1130, a center tone bandpass filter 1132, and a tail tone bandpass filter 1134. Bandpass filters 1130, 1132, and 1134 may be finite impulse response (FIR) filters. As understood by one of ordinary skill in the art, an FIR filter may be provided by, for example, designing a filter in the frequency domain, converting it to the time domain by IFFT, and then truncating or windowing the result to obtain a filter of a desired time-domain length, such as $L_1$, $L_2$ and $L_3$ in the examples described in this disclosure. Bandpass filter waveform shaper 1106 further includes an aligner and sub-symbol adder 1136 that may be configured to align (in the time domain) a weighted head tone sub-symbol provided by head tone bandpass filter 1130, a weighted center tone sub-symbol provided by center tone bandpass filter 1132, and a weighted tail tone sub-symbol provided by tail tone bandpass filter 1134 and add or sum them to form a symbol. An overlapper and symbol adder 1138 may overlap and add two successive symbols as described below with regard to FIG. 12.

Figure 19:
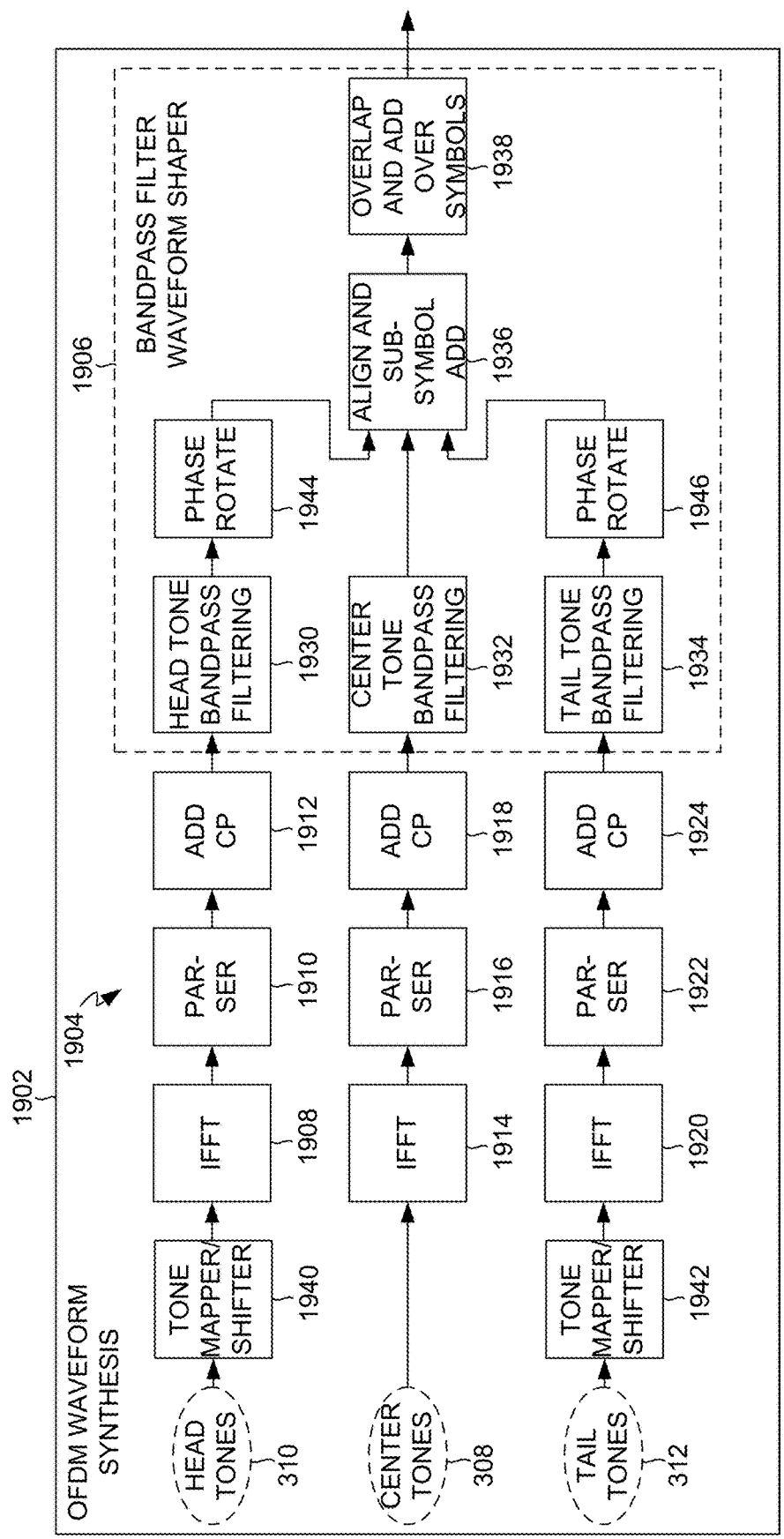
FIG. 19 is similar to FIG. 11 and illustrates yet another example of a waveform synthesis portion of a transceiver device or user equipment, in accordance with various aspects of the present disclosure.

FIG. 19 is a block diagram similar to FIG. 11, except that OFDM waveform synthesis logic 1902 additionally includes a head tone mapper and shifter 1940, a tail tone mapper and shifter 1942, a head tone phase rotator 1944, and a tail tone phase rotator 1946. Using head tone mapper and shifter 1940 and tail tone mapper and shifter 1942 to phase shift the head and tail tones, respectively, before the transform section 1904, and then using head tone phase rotator 1944 and tail tone rotator 1946 to phase rotate the head and tail tones, respectively, after bandpass filtering, enables head tone bandpass filter 1930 and tail tone bandpass filter 1934 to be identical. In other words, head tone bandpass filter 1930 and tail tone bandpass filter 1934 shown in FIG. 19 may share the same circuitry or logic. The remainder of FIG. 19 is similar to above-described FIG. 11. Accordingly, transform section 1904 includes IFFT logic 1908, a parallel-to-serial converter 1910, and extension logic 1912, which together process head tones 310, IFFT logic 1914, a parallel-to-serial converter 1916, and extension logic 1918, which together process center tones 308, and IFFT logic 1920, a parallel-to-serial converter 1922, and extension logic 1924, which together process tail tones 312. Bandpass filter waveform shaper 1906 includes head tone bandpass filter 1930, a center tone bandpass filter 1932, and tail tone bandpass filter 1934. Bandpass filters 1930, 1932, and 1934 may be FIR filters. Bandpass filter waveform shaper 1906 further includes an aligner and sub-symbol adder 1936 that may be configured to align (in the time domain) a weighted head tone sub-symbol provided by head tone bandpass filter 1930, a weighted center tone sub-symbol provided by center tone bandpass filter 1932, and a weighted tail tone sub-symbol provided by tail tone bandpass filter 1934 and add or sum them to form a symbol. An overlapper and symbol adder 1938 may overlap and add two successive symbols as described below with regard to FIG. 12.

Figure 12:
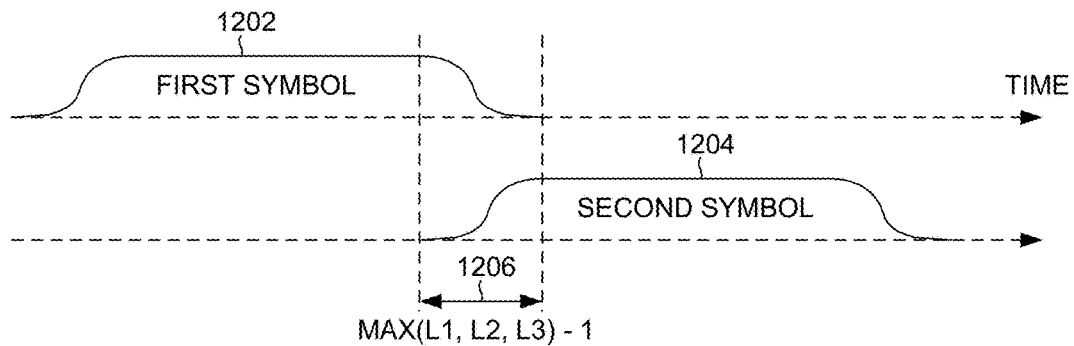
FIG. 12 is a waveform diagram illustrating an example of weighted symbol overlap and addition, in accordance with various aspects of the present disclosure.

FIG. 12 illustrates an example of an overlap and add operation that may be performed by overlapper and symbol adder 1138 (FIG. 11). The tail portion of a first symbol 1202 is overlapped with the head portion of a second symbol 1204 that immediately follows first symbol 1202 in time. The duration or length of the overlap interval 1206 may be the largest or maximal value among $L_1$, $L_2$, and $L_3$, minus one, where $L_1$ represents the length of head tone bandpass filter 1130, $L_2$ represents the length of center tone bandpass filter 1132, and $L_3$ represents the length of tail tone bandpass filter 1134. FIG. 12 may likewise illustrate an example of an overlap and add operation that may be performed by overlapper and symbol adder 1938 (FIG. 19).

Figure 13:
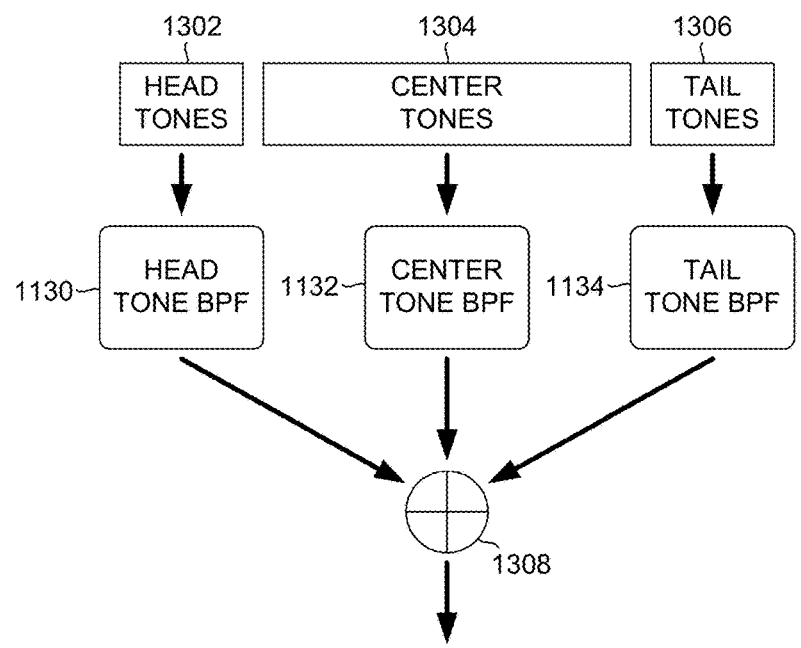
FIG. 13 illustrates waveform shaping using bandpass filtering, in accordance with various aspects of the present disclosure.

FIG. 13 conceptually illustrates the addition or summing operation 1308 that may be performed by aligner and sub-symbol adder 1136 (FIG. 11). Head tones 1302, center tones 1304, and tail tones 1306 that together represent a symbol may be filtered using above-described head tone bandpass filter 1130, center tone bandpass filter 1132, and tail tone bandpass filter 1134, respectively. Head tone bandpass filter 1130, center tone bandpass filter 1132, and tail tone bandpass filter 1134 may have lengths of $L_1$, $L_2$, and $L_3$, respectively. Although $L_1$, $L_2$, and $L_3$ may have any values, substantially shorter center tone filtering than head and tail tone filtering (i.e., $L_1 \gg L_2$, and $L_3 \gg L_2$) may help reduce ISI. FIG. 13 may likewise illustrate the addition or summing operation 1308 that may be performed by aligner and sub-symbol adder 1936 (FIG. 19).

Figure 14A:
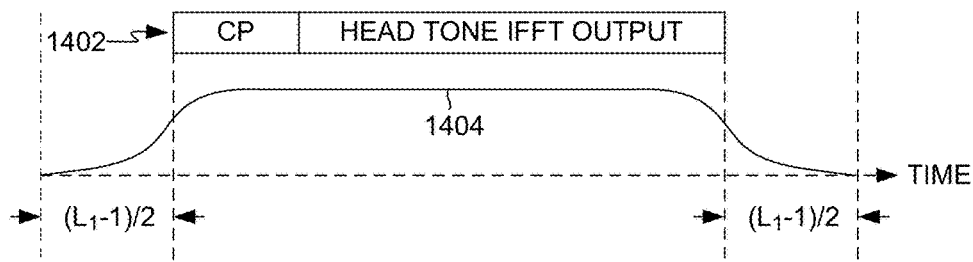
FIG. 14A is a waveform diagram of an example of head tone bandpass filtering, in accordance with various aspects of the present disclosure.

FIG. 14A illustrates an example of a head tone sub-symbol 1402 and a filtered head tone sub-symbol 1404. Head tone bandpass filter 1130 (FIG. 11) with length $L_1$ may be applied.

Figure 14B:
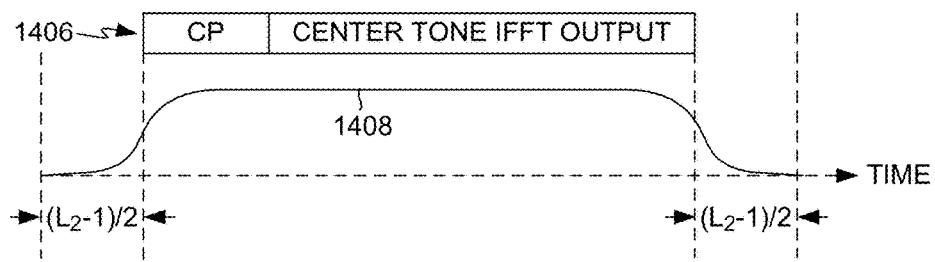
FIG. 14B is a waveform diagram of an example of a center tone bandpass filtering, in accordance with various aspects of the present disclosure.

FIG. 14B further illustrates an example of a center tone sub-symbol 1406 and a filtered center tone sub-symbol 1408. Center tone bandpass filter 1132 (FIG. 11) with length $L_2$ may be applied.

Figure 14C:
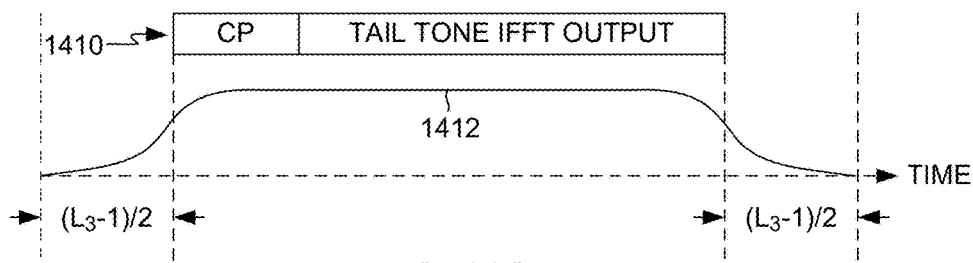
FIG. 14C is a waveform diagram of an example of a tail tone bandpass filtering.

FIG. 14C still further illustrates an example of a tail tone sub-symbol 1410 and a filtered tail tone sub-symbol 1412. Tail tone bandpass filter 1134 (FIG. 11) with length $L_3$ may be applied.

Figure 15:
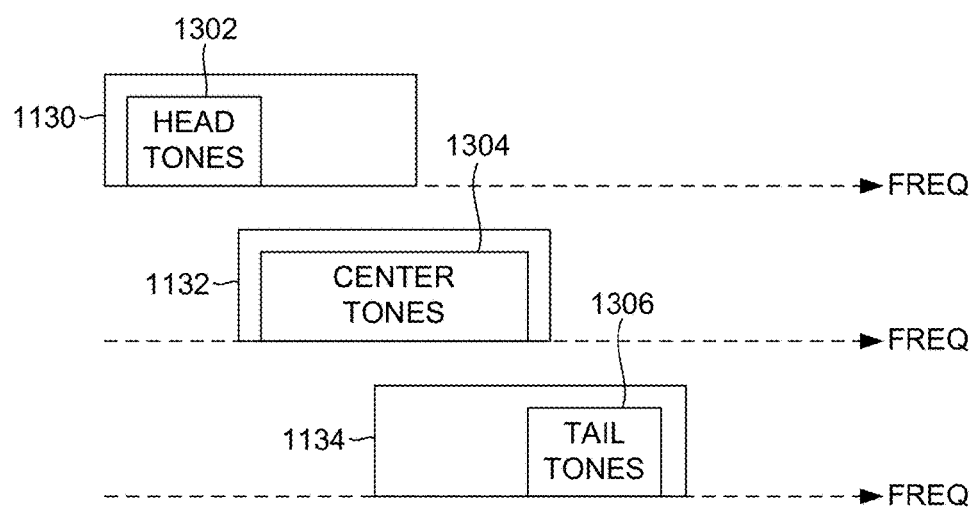
FIG. 15 illustrates asymmetric head tone and tail tone bandpass filters, in accordance with various aspects of the present disclosure.

FIG. 15 illustrates asymmetric filtering. In the example shown in FIG. 15, head tones 1302 are concentrated closer to the lower-frequency end of the passband of head tone bandpass filter 1130 than to the higher-frequency end, while tail tones 1306 are concentrated closer to the higher-frequency end of the passband of tail tone bandpass filter 1134. In the example shown in FIG. 15, center tones 1304 are centered within the passband of center tone bandpass filter 1132.

Figure 16:
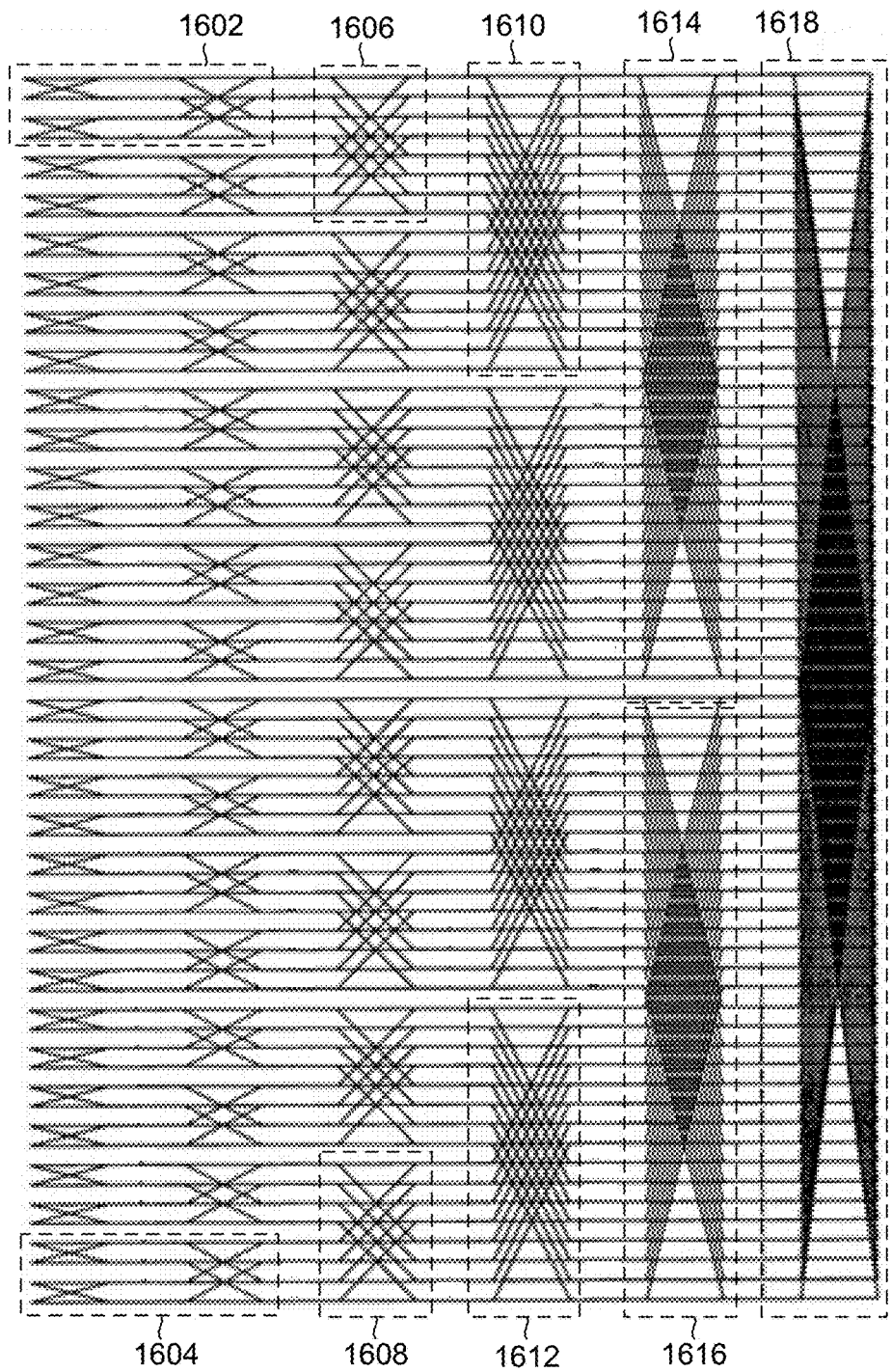
FIG. 16 is a Fast Fourier Transform (FFT) diagram, representing FFT logic configured to concurrently transform head tones and tail tones, in accordance with various aspects of the present disclosure.

FIG. 16 is a IFFT diagram (also referred to as a "butterfly diagram") illustrating that head tones 1302 and tail tones 1306 may be processed concurrently using a single IFFT logic element. For example, a single IFFT logic element efficiently may be used to implement IFFT logic 408 and IFFT logic 420 (FIG. 4). The head tones and tail tones may be shifted in the frequency domain to avoid interference between stages of head tone and tail tone computations. The example shown in FIG. 16 relates to an exemplary IFFT logic element having a radix-4 architecture. Note that head tone first-stage processing 1602 does not interfere with tail tone first-stage processing 1604, head tone second-stage processing 1606 does not interfere with tail tone second-stage processing 1608, head tone third-stage processing 1610 does not interfere with tail tone third-stage processing 1612, and head tone fourth-stage processing 1614 does not interfere with tail tone fourth-stage processing 1616. In the last-stage processing 1618, head tones and tail tones may be processed separately, and may be shifted back to the desired location in the frequency domain.

Figure 17:
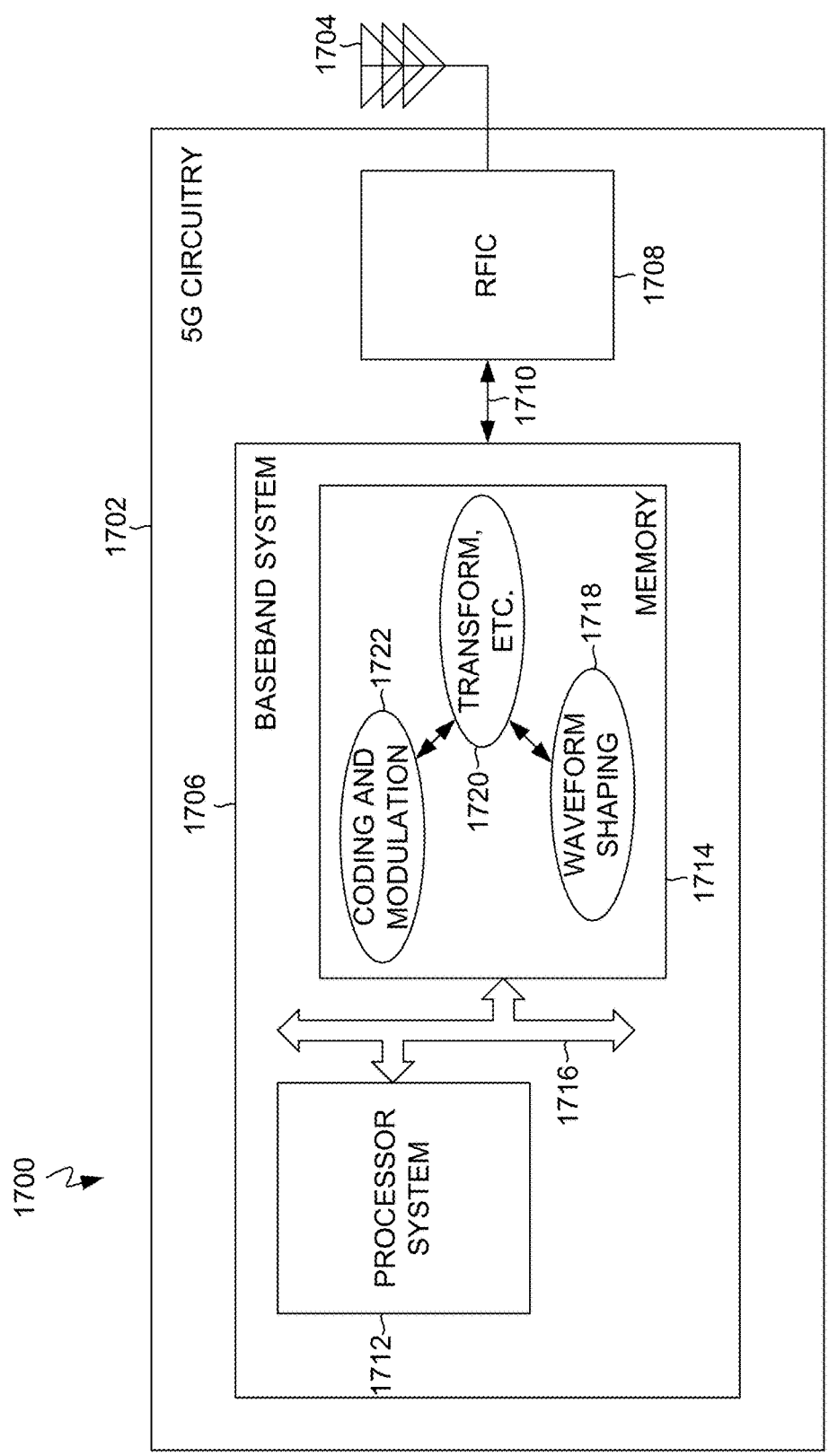
FIG. 17 is a block diagram of an example of a wireless communications transceiver device or user equipment, in accordance with various aspects of the present disclosure.

FIG. 17 is a block diagram of a UE 1700, in accordance with various aspects of the present disclosure. The UE 1700 may be an example of one or more aspects of UE 115 described above with reference to FIG. 1 or UE 200 described with reference to FIG. 2. The UE 1700 may include 5G circuitry 1702. Some of the operational elements of 5G circuitry 1702 are not shown in FIG. 17 for purposes of clarity, but are known to those having ordinary skill in the art.

The UE 1700 may generally include components for bi-directional voice and data communications, including components for transmitting communications and components for receiving communications. The UE 1700 may include one or more antennas 1704 coupled to 5G circuitry 1702. Antennas 1704 may comprise one or more antenna elements, may comprise an array, or a phased array, of antenna elements, and may comprise one or more directional and/or omni-directional antenna elements. The 5G circuitry 1702 may be configured to establish a 5G communication channel with a base station 105 (FIG. 1) over one or more communication links 125 (FIG. 1). The 5G circuitry 1702 may be configured to communicate over millimeter wave (mmW) frequencies. The 5G circuitry 1702 may be configured to concurrently transmit and receive multiple wireless transmissions via multi-carrier techniques.

The 5G circuitry 1702 may comprise a baseband system 1706 and a radio frequency integrated circuit (RFIC) 1708 operatively coupled together over a bi-directional connection 1710. The RFIC 1708 may be configured to accommodate multiple-input-multiple-output (MIMO) or diversity streams.

Baseband system 1706 may include a processor system 1712 and a memory system 1714, which may communicate, directly or indirectly, with each other (e.g., via one or more buses 1716). Baseband system 1706 may be configured to perform the baseband functions described above with regard to FIG. 2. Some or all such functions may be performed under the control of processor system 1712 through the execution of logic or instructions in the form of software, firmware, etc. For example, some or all of the waveform shaping methods described in this disclosure may be performed under the control of processor system 1712 through the execution of waveform shaping logic 1718. Similarly, some or all of the FFT or IFFT methods described in this disclosure may be performed under the control of processor system 1712 through the execution of transform logic 1720. Likewise, some or all of the coding and modulation methods described in this disclosure may be performed under the control of processor system 1712 through the execution of coding and modulation logic 1722. In the example shown in FIG. 17, memory system 1714 is configured with, among other things, waveform shaping logic 1718, transform logic 1720, and coding and modulation logic 1722. In this example, waveform shaping logic 1718, transform logic 1720, and coding and modulation logic 1722 may be in the form of software or firmware. More generally, memory system 1714 or other memory (not shown) may be configured with software or firmware, which, when executed by processor system 1712 or other processors (not shown), causes UE 1700 to control various methods, including the methods described in this disclosure. Although for purposes of clarity waveform shaping logic 1718, transform logic 1720, and coding and modulation logic 1722 are shown in FIG. 17 in a conceptual manner as stored in or residing in memory system 1714 in the manner of software or firmware, it should be understood that such logic elements may be made accessible to processor system 1712 or may configure processor system 1712 in any manner. In addition to waveform shaping logic 1718, transform logic 1720, and coding and modulation logic 1722, additional logic, including logic that causes UE 1700 to control conventional methods commonly associated with UE communications or other UE operation, may be included but is not shown in FIG. 17 for purposes of clarity. Memory system 1714 is an example of a computer program product comprising a non-transitory computer-readable medium having stored therein in computer-executable form, code or instructions (e.g., waveform shaping logic 1718, transform logic 1720, and coding and modulation logic 1722) which, when executed by processor system 1712, may control the methods of operation described in this disclosure. Some or all of baseband system 1706 and RFIC 1708 may be implemented using one or more application-specific integrated circuits (ASICs) adapted to control some or all of the associated methods or functions described herein. Alternatively, the methods or functions may be controlled by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art.

Figure 18:
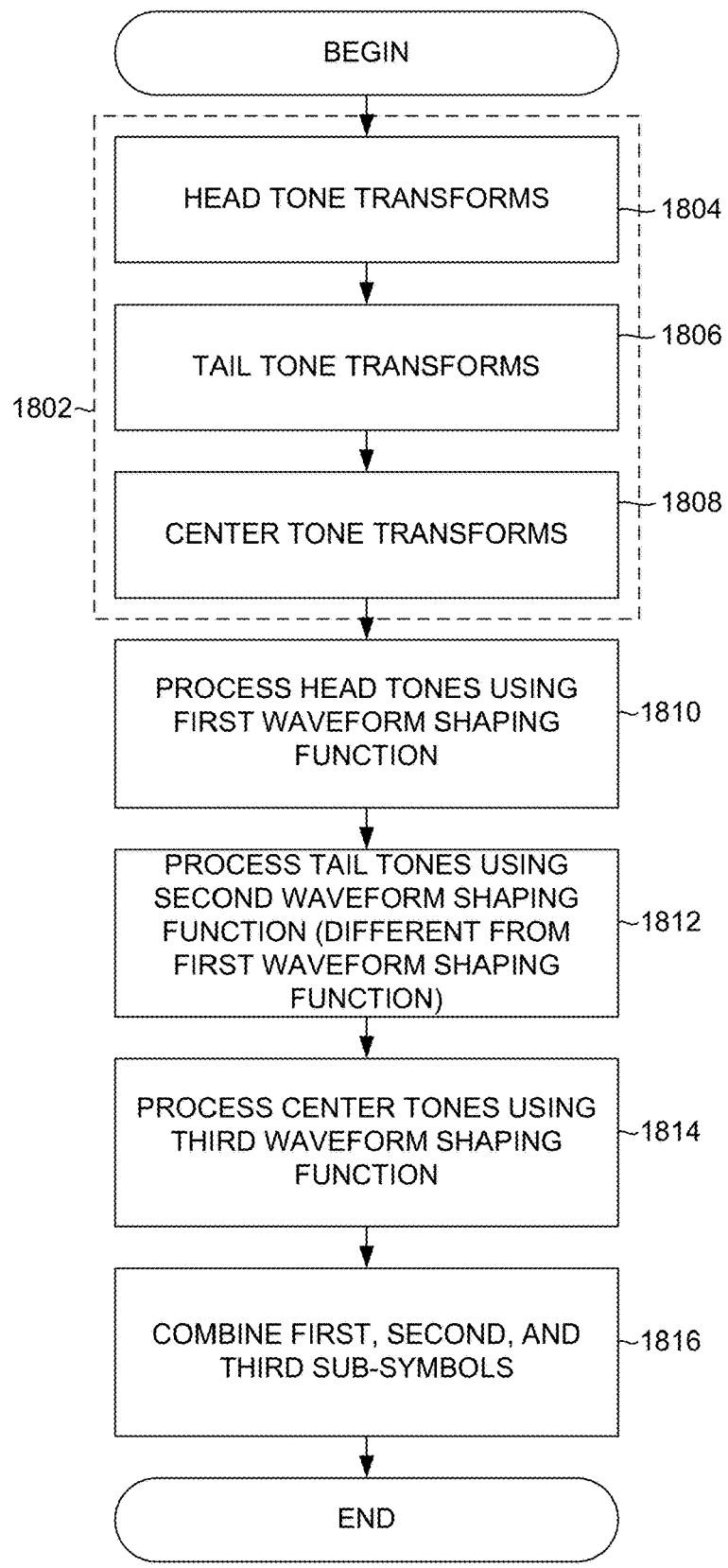
FIG. 18 is a flow diagram illustrating an example of a method for waveform shaping, in accordance with various aspects of the present disclosure.

FIG. 18 is a flow diagram illustrating an example of a method for waveform shaping in a wireless communications device. It should be understood that the order in which the blocks are shown or described is not intended to be limiting. As indicated by block 1802, tone transforms may be performed. In a transmitter, the transforms may comprise IFFTs, while in a receiver the transforms may comprise FFTs. In a transceiver, the transforms may comprise both IFFTs and FFTs. For example, as indicated by block 1804, first plurality of tones (e.g., head tones) of a multi-tone carrier may be transformed. Similarly, as indicated by block 1806, a second plurality of tones (e.g., tail tones) of the multi-tone carrier may be transformed. As indicated by block 1808, a third plurality of tones (e.g., center tones) of the multi-tone carrier also may be transformed. The transforms may include ancillary operations, such as the addition of a cyclic prefix. Transform section 304 (FIG. 3), 404 (FIG. 4), 1004 (FIG. 10), or 1104 (FIG. 11), transform logic 1720 (FIG. 17), etc., may serve as an example of a means for performing the functions indicated by block 1802.

As indicated by block 1810, the first plurality of tones (e.g., head tones) may be processed using a first waveform shaping characteristic to provide a first sub-symbol. As indicated by block 1812, the second plurality of tones (e.g., tail tones) may be processed using a second waveform shaping characteristic to provide a second sub-symbol. At least the first and second waveform shaping characteristics may be different from each other. As indicated by block 1814, the third plurality of tones (e.g., center tones) additionally may be processed using a third waveform shaping characteristic to provide a third sub-symbol. The third waveform shaping characteristic may be different from at least one of the first and second waveform shaping characteristics.

In an example, the first, second, and third waveform shaping characteristics may be a first, second, and third WOLA weighting functions, respectively. In such an example, at least the first and second WOLA weighting functions may be different from each other. Also, as described above, the first, second, and third WOLA weighting functions may be complex, i.e., include real and imaginary parts. In such an example, head tone processor 332 (FIG. 3) or head tone weighting function 430 (FIG. 4) may serve as a means for performing the functions indicated by block 1810. In such an example, tail tone processor 334 (FIG. 3) or tail tone weighting function 434 (FIG. 4) may serve as a means for performing the functions indicated by block 1812. In such an example, center tone processor 336 (FIG. 3) or center tone weighting function 432 (FIG. 4) may serve as a means for performing the functions indicated by block 1814.

Alternatively, in another example, the first, second, and third waveform shaping characteristics may be first, second, and third bandpass filter functions. In such an example, at least the first and second bandpass filter functions may be different from each other. In such an example, head tone processor 332 (FIG. 3) or head tone bandpass filter 1130 (FIG. 11) may serve as a means for performing the functions indicated by block 1810. In such an example, tail tone processor 334 (FIG. 3) or tail tone bandpass filter 1134 (FIG. 11) may serve as a means for performing the functions indicated by block 1812. In such an example, center tone processor 336 (FIG. 3) or center tone bandpass filter 1132 (FIG. 11) may serve as a means for performing the functions indicated by block 1814.

As indicated by block 1816, the first, second, and third sub-symbols may be combined to provide an output symbol. Combiner 338 (FIG. 3), aligner and sub-symbol adder 436 (FIG. 4) or 1136 (FIG. 11), overlapper and symbol adder 438 (FIG. 4) or 1138 (FIG. 11), etc., may serve as examples of means for performing the functions indicated by block 1816.

Figure 20:
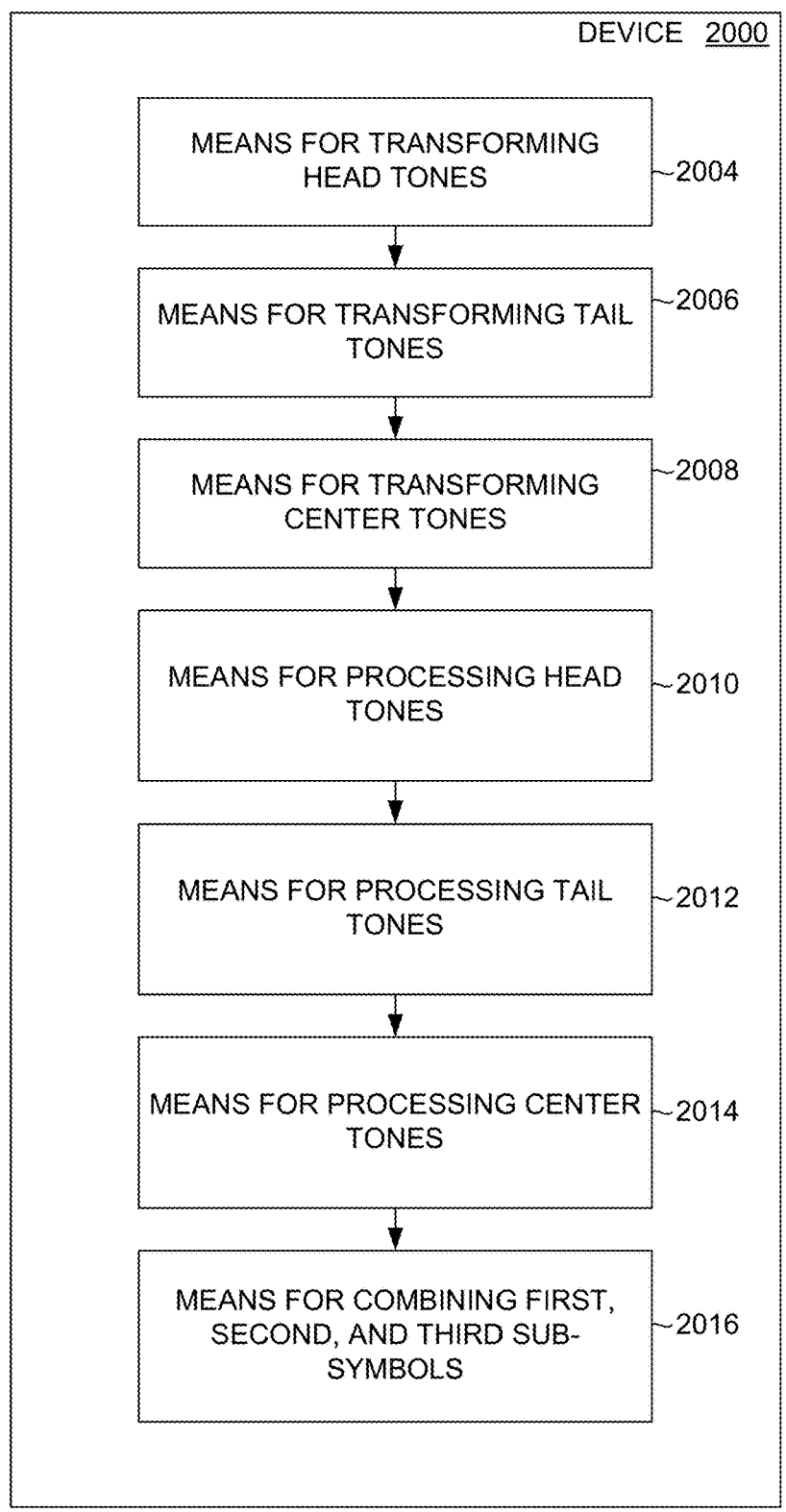
FIG. 20 is a functional block diagram illustrating a device for waveform shaping, in accordance with various aspects of the present disclosure.

FIG. 20 is a functional block diagram illustrating a device 2000 for waveform shaping. As indicated by block 2004, the device may include means for transforming a first plurality of tones (e.g., head tones) of a multi-tone carrier between frequency domain and time domain. As indicated by block 2006, the device may include means for transforming a second plurality of tones (e.g., tail tones) of a multi-tone carrier between frequency domain and time domain. As indicated by block 2008, the device may include means for transforming a third plurality of tones (e.g., center tones) of a multi-tone carrier between frequency domain and time domain. As indicated by block 2010, the device may include means for processing the first plurality of tones using a first waveform shaping characteristic to provide a first sub-symbol. As indicated by block 2012, the device may include means for processing the second plurality of tones using a second waveform shaping characteristic to provide a second sub-symbol. At least the first and second waveform shaping characteristics may be different from each other. As indicated by block 2014, the device may include means for processing the third plurality of tones using a third waveform shaping characteristic to provide a third sub-symbol. The third waveform shaping characteristic may be different from at least one of the first and second waveform shaping characteristics. As indicated by block 2016, the device may include means for combining the first sub-symbol, the second sub-symbol, and the third sub-symbol to provide an output symbol.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and do not mean "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Non-transitory computer-readable media include both computer storage media and communication media including any non-transitory medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. "Disk" and "disc," as used may be herein, include compact disc (CD), laser disc, optical disc, digital versatile disc (DVD), floppy disk, and Blu-ray disc, where disks usually reproduce data magnetically, while discs reproduce data optically with lasers. Combinations of the above are also included within the scope of non-transitory computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Therefore, although selected aspects have been illustrated and described in detail, it will be understood that various substitutions and alterations may be made therein without departing from the spirit and scope of the present invention, as defined by the following claims.

What is claimed is:

1. A method for waveform shaping in a wireless communications device, comprising:
    transforming a first plurality of tones of a multi-tone carrier between frequency domain and time domain;
    transforming a second plurality of tones of the multi-tone carrier between frequency domain and time domain;
    processing the first plurality of tones using a first waveform shaping characteristic to provide a first sub-symbol;
    processing the second plurality of tones using a second waveform shaping characteristic to provide a second sub-symbol, wherein the first and second waveform shaping characteristics are different from each other; and combining the first sub-symbol and the second sub-symbol to provide an output symbol.

2. The method of claim 1, wherein:
the first waveform shaping characteristic is a first weighting function;
processing the first plurality of tones comprises performing a weighting operation using the first weighting function;
the second waveform shaping characteristic is a second weighting function different from the first weighting function; and
processing the second plurality of tones comprises performing the weighting operation using the second weighting function.

3. The method of claim 2, wherein:
the first weighting function has a first length; and
the second weighting function has a second length different from the first length.

4. The method of claim 2, wherein:
each of the first and second weighting functions has a real part and an imaginary part; and
the first weighting function and the second weighting function are complex conjugates of each other.

5. The method of claim 1, further comprising:
transforming a third plurality of tones of the multi-tone carrier between frequency domain and time domain, the third plurality of tones being between the first plurality of tones and the second plurality of tones; and
processing the third plurality of tones using a third waveform shaping characteristic to provide a third sub-symbol;
wherein combining the first sub-symbol and the second sub-symbol to provide an output symbol comprises combining the first sub-symbol, the second sub-symbol, and the third sub-symbol to provide the output symbol.

6. The method of claim 1, wherein:
the first waveform shaping characteristic is a first filter passband having a first end and a second end, wherein the first plurality of tones are concentrated nearer the first end of the first filter passband than the second end of the first filter passband;
processing the first plurality of tones comprises bandpass filtering using the first filter passband;
the second waveform shaping characteristic is a second filter passband having a first end and a second end, wherein the second plurality of tones are concentrated nearer the second end of the second filter passband than the first end of the second filter passband; and
processing the second plurality of tones comprises bandpass filtering using the second filter passband.

7. The method of claim 6, further comprising:
shifting the first plurality of tones and second plurality of tones in frequency before transforming the first plurality of tones and second plurality of tones; and
rotating the first plurality of tones and second plurality of tones in phase before combining the first sub-symbol and second sub-symbol.

8. The method of claim 1, wherein transforming a first plurality of tones and transforming a second plurality of tones are performed concurrently with each other using a single inverse fast Fourier transform.

9. A system for waveform shaping in a wireless communications device, comprising:
a first transform path configured to transform a first plurality of tones of a multi-tone carrier between frequency domain and time domain;
a second transform path configured to transform a second plurality of tones of the multi-tone carrier between frequency domain and time domain;
a waveform shaper configured to process the first plurality of tones using a first waveform shaping characteristic to provide a first sub-symbol and configured to process the second plurality of tones using a second waveform shaping characteristic to provide a second sub-symbol, wherein the first and second waveform shaping characteristics are different from each other; and
a combiner configured to combine the first sub-symbol and the second sub-symbol to provide an output symbol.

10. The system of claim 9, wherein:
the first waveform shaping characteristic is a first weighting function;
the waveform shaper is configured to process the first plurality of tones by performing a weighting operation using the first weighting function;
the second waveform shaping characteristic is a second weighting function different from the first weighting function; and
the waveform shaper is configured to process the second plurality of tones by performing the weighting operation using the second weighting function.

11. The system of claim 10, wherein:
the first weighting function has a first length; and
the second weighting function has a second length different from the first length.

12. The system of claim 10, wherein:
each of the first and second weighting functions has a real part and an imaginary part; and
the first weighting function and the second weighting function are complex conjugates of each other.

13. The system of claim 9, further comprising:
a third transform path configured to transform a third plurality of tones of the multi-tone carrier between frequency domain and time domain, the third plurality of tones being between the first plurality of tones and the second plurality of tones;
wherein the waveform shaper is configured to process the third plurality of tones using a third waveform shaping characteristic to provide a third sub-symbol, and the combiner is configured to combine the first sub-symbol, the second sub-symbol, and the third sub-symbol to provide the output symbol.

14. The system of claim 9, wherein:
the first waveform shaping characteristic is a first filter passband having a first end and a second end, wherein the first plurality of tones are concentrated nearer the first end of the first filter passband than the second end of the first filter passband;
the waveform shaper is configured to process the first plurality of tones by bandpass filtering using the first filter passband;
the second waveform shaping characteristic is a second filter passband having a first end and a second end, wherein the second plurality of tones are concentrated nearer the second end of the second filter passband than the first end of the second filter passband; and
the waveform shaper is configured to process the second plurality of tones by bandpass filtering using the second filter passband.

15. The system of claim 14, further comprising:
shifting the first plurality of tones and second plurality of tones in frequency before transforming the first plurality of tones and second plurality of tones; and rotating the first plurality of tones and second plurality of tones in phase before combining the first sub-symbol and second sub-symbol.

16. The system of claim 9, wherein the first transform path is configured to transform the first plurality of tones and the second transform path is configured to transform the second plurality of tones concurrently with each other using a single inverse fast Fourier transform.

17. A computer program product comprising a non-transitory computer-readable medium storing computer-executable code for waveform shaping in a wireless communications device, the code executable by one or more processors to control a method, comprising:
   transforming a first plurality of tones of a multi-tone carrier between frequency domain and time domain;
   transforming a second plurality of tones of the multi-tone carrier between frequency domain and time domain;
   processing the first plurality of tones using a first waveform shaping characteristic to provide a first sub-symbol;
   processing the second plurality of tones using a second waveform shaping characteristic to provide a second sub-symbol, wherein the first and second waveform shaping characteristics are different from each other; and
   combining the first sub-symbol and the second sub-symbol to provide an output symbol.

18. The computer program product of claim 17, wherein:
   the first waveform shaping characteristic is a first weighting function;
   processing the first plurality of tones comprises performing a weighting operation using the first weighting function;
   the second waveform shaping characteristic is a second weighting function different from the first weighting function; and
   processing the second plurality of tones comprises performing the weighting operation using the second weighting function.

19. The computer program product of claim 18, wherein:
   the first weighting function has a first length; and
   the second weighting function has a second length different from the first length.

20. The computer program product of claim 18, wherein:
   each of the first and second weighting functions has a real part and an imaginary part; and
   the first weighting function and the second weighting function are complex conjugates of each other.

21. The computer program product of claim 17, further comprising:
   transforming a third plurality of tones of the multi-tone carrier between frequency domain and time domain, the third plurality of tones being between the first plurality of tones and the second plurality of tones; and
   processing the third plurality of tones using a third waveform shaping characteristic to provide a third sub-symbol;
   wherein combining the first sub-symbol and the second sub-symbol to provide an output symbol comprises combining the first sub-symbol, the second sub-symbol, and the third sub-symbol to provide the output symbol.

22. The computer program product of claim 17, wherein:
   the first waveform shaping characteristic is a first filter passband having a first end and a second end, wherein the first plurality of tones are concentrated nearer the first end of the first filter passband than the second end of the first filter passband;
   processing the first plurality of tones comprises bandpass filtering using the first filter passband;
   the second waveform shaping characteristic is a second filter passband having a first end and a second end, wherein the second plurality of tones are concentrated nearer the second end of the second filter passband than the first end of the second filter passband; and
   processing the second plurality of tones comprises bandpass filtering using the second filter passband.

23. The computer program product of claim 22, further comprising:
   shifting the first plurality of tones and second plurality of tones in frequency before transforming the first plurality of tones and second plurality of tones; and
   rotating the first plurality of tones and second plurality of tones in phase before combining the first sub-symbol and second sub-symbol.

24. The computer program product of claim 17, wherein transforming the first plurality of tones and transforming the second plurality of tones are performed concurrently with each other using a single inverse fast Fourier transform.

25. A device for waveform shaping in a wireless communications device, comprising:
   means for transforming a first plurality of tones of a multi-tone carrier between frequency domain and time domain;
   means for transforming a second plurality of tones of the multi-tone carrier between frequency domain and time domain;
   means for processing the first plurality of tones using a first waveform shaping characteristic to provide a first sub-symbol;
   means for processing the second plurality of tones using a second waveform shaping characteristic to provide a second sub-symbol, wherein the first and second waveform shaping characteristics are different from each other; and
   means for combining the first sub-symbol and the second sub-symbol to provide an output symbol.

26. The device of claim 25, wherein:
   the first waveform shaping characteristic is a first weighting function;
   the means for processing the first plurality of tones comprises means for performing a weighting operation using the first weighting function;
   the second waveform shaping characteristic is a second weighting function different from the first weighting function; and
   the means for processing the second plurality of tones comprises means for performing the weighting operation using the second weighting function.

27. The device of claim 26, wherein:
   the first weighting function has a first length; and
   the second weighting function has a second length different from the first length.

28. The device of claim 26, wherein:
   each of the first and second weighting functions has a real part and an imaginary part; and
   the first weighting function and the second weighting function are complex conjugates of each other.

29. The device of claim 25, further comprising:
   means for transforming a third plurality of tones of the multi-tone carrier between frequency domain and time domain, the third plurality of tones being between the first plurality of tones and the second plurality of tones; and means for processing the third plurality of tones using a third waveform shaping characteristic to provide a third sub-symbol;

wherein the means for combining the first sub-symbol and the second sub-symbol to provide an output symbol comprises means for combining the first sub-symbol, the second sub-symbol, and the third sub-symbol to provide the output symbol.

30. The device of claim 25, wherein:

the first waveform shaping characteristic is a first filter passband having a first end and a second end, wherein the first plurality of tones are concentrated nearer the first end of the first filter passband than the second end of the first filter passband;

the means for processing the first plurality of tones comprises means for bandpass filtering using the first filter passband;

the second waveform shaping characteristic is a second filter passband having a first end and a second end, wherein the second plurality of tones are concentrated nearer the second end of the second filter passband than the first end of the second filter passband; and the means for processing the second plurality of tones comprises means for bandpass filtering using the second filter passband.

\* \* \* \* \*